US012636578B2

(12) United States Patent
Scalabrini et al.

(10) Patent No.: US 12,636,578 B2
(45) Date of Patent: May 26, 2026

(54) SIMULATED SPACE LOCAL PARTITION REASSIGNMENT AND APPLICATION AUTOSCALING

(71) Applicant: Amazon Technologies, Inc., Seattle, WA (US)

(72) Inventors: Christopher Denis Scalabrini, Kirkland, WA (US); Adam Julio Villalobos, Mountlake Terrace, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 18/346,021

(22) Filed: Jun. 30, 2023

(65) Prior Publication Data

US 2025/0001292 A1     Jan. 2, 2025

(51) Int. Cl.
*A63F 13/355* (2014.01)
*A63F 13/358* (2014.01)

(52) U.S. Cl.
CPC .......... *A63F 13/355* (2014.09); *A63F 13/358* (2014.09)

(58) Field of Classification Search
CPC ............. G06Q 10/06312; A63F 13/355; A63F 13/358; A63F 13/352; A63F 2300/534; A63F 13/60; G06F 16/909; G06F 16/23; G06F 9/5066; G06F 11/3433; G06F 11/3452
See application file for complete search history.

(56) References Cited

U.S. PATENT DOCUMENTS 9,195,512 B2     11/2015   Lemay et al.
10,915,363 B2     2/2021   Houlbert et al.
11,513,854 B1     11/2022   Saxena et al.
(Continued)

FOREIGN PATENT DOCUMENTS

WO     WO 2017/209788 A1     12/2017

OTHER PUBLICATIONS

CCP Prism X, "Building a Balance Universe.", Dec. 3, 2013, EVE Online, https://www.eveonline.com/news/view/building-a-balanced-universe (Year: 2013).*
(Continued)

*Primary Examiner* — Ankit B Doshi
(74) *Attorney, Agent, or Firm* — BakerHostetler

(57)     ABSTRACT

Automated scaling-related operations may be performed dynamically during execution of a spatial simulation. A spatial partition may be locally reassigned, based on application workload information, from a first application to a second application on the same worker. A quantity of applications on a worker may also be changed during execution of a spatial simulation. A parent spatial partition may be split into child spatial partitions, and child partitions may also be merged back into a common parent partition. Indications of partition splits and merges on each of a plurality of workers may be reported to the plurality of workers. A spatial partition may also be remotely reassigned from a first worker to a second worker, such as based on worker-level resource consumption information and partition information. A quantity of workers that are used to implement a spatial simulation may also be changed during execution of the spatial simulation.

20 Claims, 19 Drawing Sheets

(56) References Cited

U.S. PATENT DOCUMENTS

| | | | |
|---|---|---|---|
| 11,775,545 B1* | 10/2023 | Fritz | G06F 3/0605 |
| | | | 707/802 |
| 11,943,226 B2 | 3/2024 | Upton et al. | |
| 2004/0168170 A1 | 8/2004 | Miller | |
| 2006/0206891 A1* | 9/2006 | Armstrong | G06F 9/45537 |
| | | | 718/1 |
| 2007/0013701 A1 | 1/2007 | Segawa et al. | |
| 2007/0038836 A1 | 2/2007 | Hintermeister et al. | |
| 2011/0179105 A1* | 7/2011 | Lindsay | G06F 9/5061 |
| | | | 709/203 |
| 2013/0253675 A1* | 9/2013 | Kurabayashi | A63F 13/33 |
| | | | 700/91 |
| 2014/0173135 A1 | 6/2014 | Varney et al. | |
| 2014/0380330 A1 | 12/2014 | Xiao et al. | |
| 2016/0357674 A1* | 12/2016 | Waldspurger | G06F 12/0893 |
| 2017/0054797 A1 | 2/2017 | Helmich et al. | |
| 2018/0060461 A1 | 3/2018 | Whitehead et al. | |
| 2018/0278680 A1 | 9/2018 | Liu | |
| 2019/0370070 A1 | 12/2019 | Houlbert et al. | |
| 2020/0271801 A1 | 8/2020 | Kayum | |
| 2020/0310884 A1* | 10/2020 | Villalobos | G06F 16/909 |
| 2020/0311142 A1* | 10/2020 | Edelman | G06F 16/9027 |
| 2022/0343594 A1* | 10/2022 | Loodin Ek | A63F 13/60 |
| 2022/0395748 A1* | 12/2022 | Salvi | A63F 13/355 |
| 2023/0153167 A1 | 5/2023 | Wang et al. | |
| 2024/0131422 A1* | 4/2024 | Kanza | A63F 13/358 |
| 2024/0181339 A1* | 6/2024 | Abhishek | A63F 13/355 |
| 2024/0297910 A1 | 9/2024 | Shen et al. | |
| 2025/0004863 A1* | 1/2025 | Scalabrini | G06F 9/52 |

OTHER PUBLICATIONS

International Patent Application No. PCT/US2024/035827; Int'l Search Report and the Written Opinion; dated Nov. 13, 2024; 21 pages.

Van Den Bossche et al.; "Autonomic microcell assignment in massively distributed online virtual environments"; Journal of Network and Computer Applications; vol. 32; 2009; p. 1242-1256.

Lui et al., An efficient partitioning algorithm for distributed virtual environment systems, IEEE Transactions on Parallel and Distributed Systems, 13(1): 193-211, 2002.

Stillwell et al., Resource allocation using virtual clusters, 9th IEEE/ACM International Symposium on Cluster Computing and the Grid, IEEE, 20 pages, 2009.

Wang et al., Virtual machine placement and workload assignment for mobile edge computing, 6th IEEE International Conference on Cloud Networking (CloudNet), IEEE, 7 pages, 2017.

Xiao et al., Dynamic resource allocation using virtual machines for cloud computing environment, IEEE Transactions on Parallel and Distributed Systems, 24: 1107-1117, 2002.

* cited by examiner

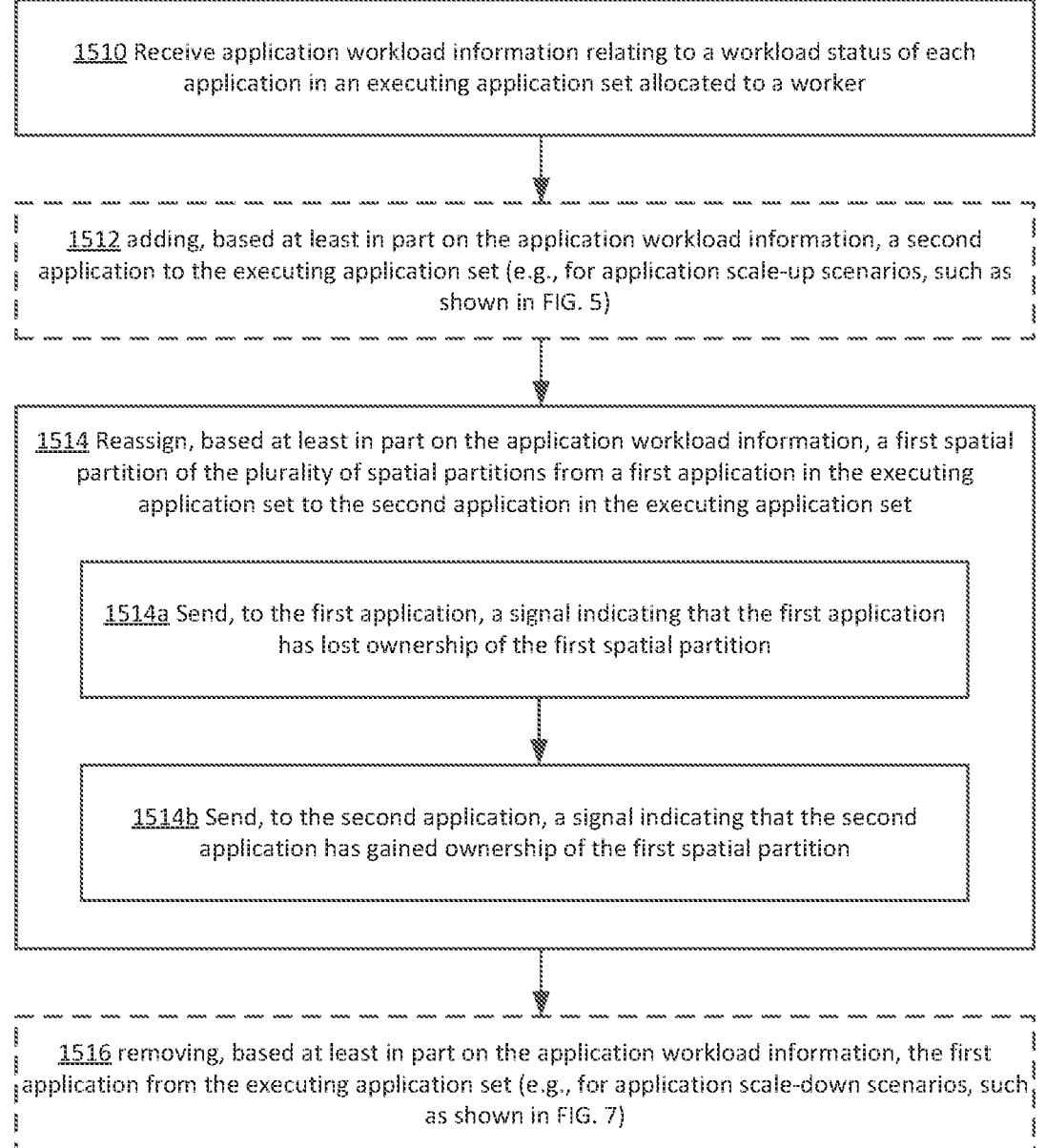

1510 Receive application workload information relating to a workload status of each application in an executing application set allocated to a worker 1512 adding, based at least in part on the application workload information, a second application to the executing application set (e.g., for application scale-up scenarios, such as shown in FIG. 5)

1514 Reassign, based at least in part on the application workload information, a first spatial partition of the plurality of spatial partitions from a first application in the executing application set to the second application in the executing application set 1514a Send, to the first application, a signal indicating that the first application has lost ownership of the first spatial partition 1514b Send, to the second application, a signal indicating that the second application has gained ownership of the first spatial partition 1516 removing, based at least in part on the application workload information, the first application from the executing application set (e.g., for application scale-down scenarios, such as shown in FIG. 7)

FIG. 15

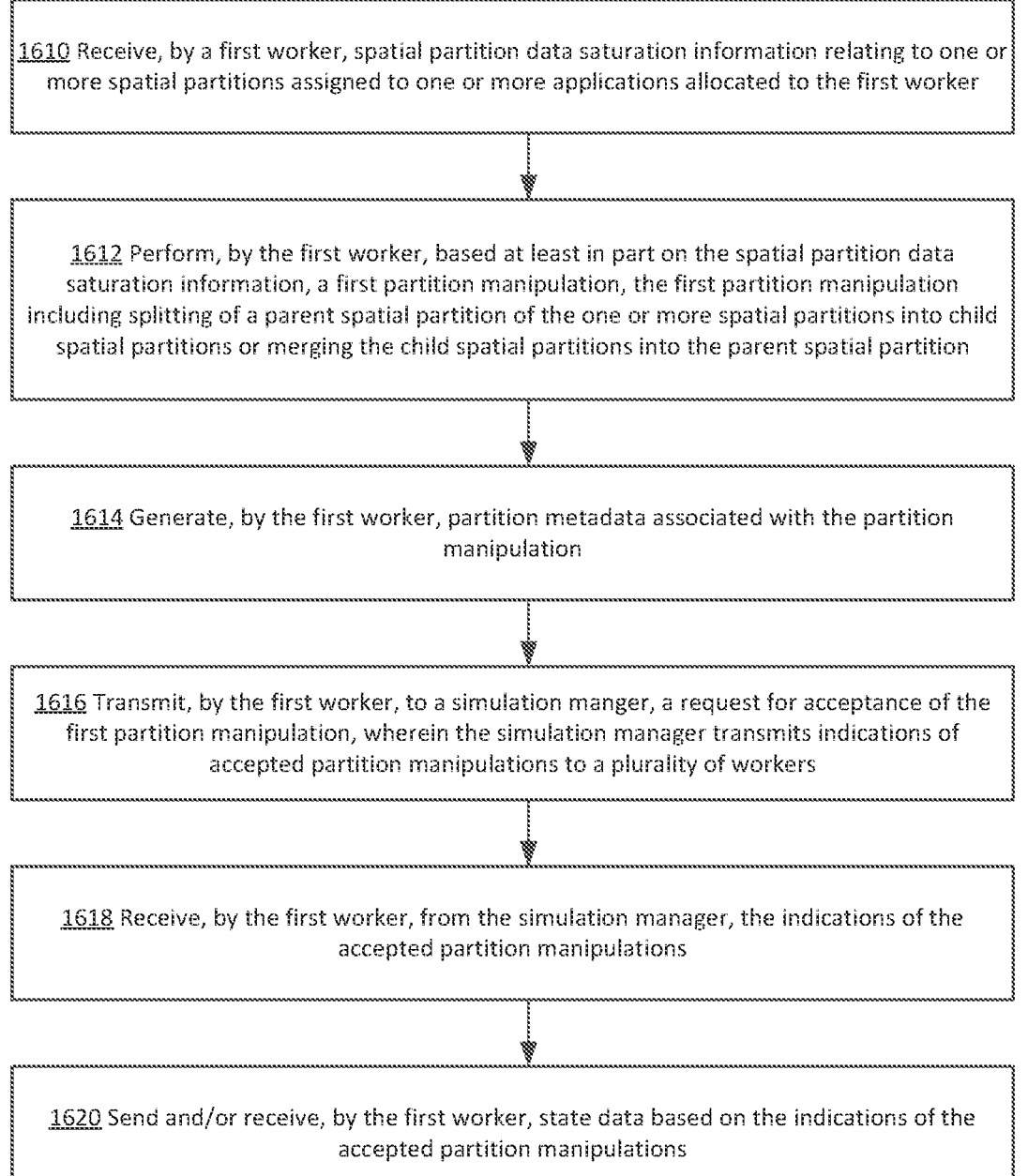

1610 Receive, by a first worker, spatial partition data saturation information relating to one or more spatial partitions assigned to one or more applications allocated to the first worker 1612 Perform, by the first worker, based at least in part on the spatial partition data saturation information, a first partition manipulation, the first partition manipulation including splitting of a parent spatial partition of the one or more spatial partitions into child spatial partitions or merging the child spatial partitions into the parent spatial partition 1614 Generate, by the first worker, partition metadata associated with the partition manipulation 1616 Transmit, by the first worker, to a simulation manger, a request for acceptance of the first partition manipulation, wherein the simulation manager transmits indications of accepted partition manipulations to a plurality of workers 1618 Receive, by the first worker, from the simulation manager, the indications of the accepted partition manipulations 1620 Send and/or receive, by the first worker, state data based on the indications of the accepted partition manipulations

FIG. 16

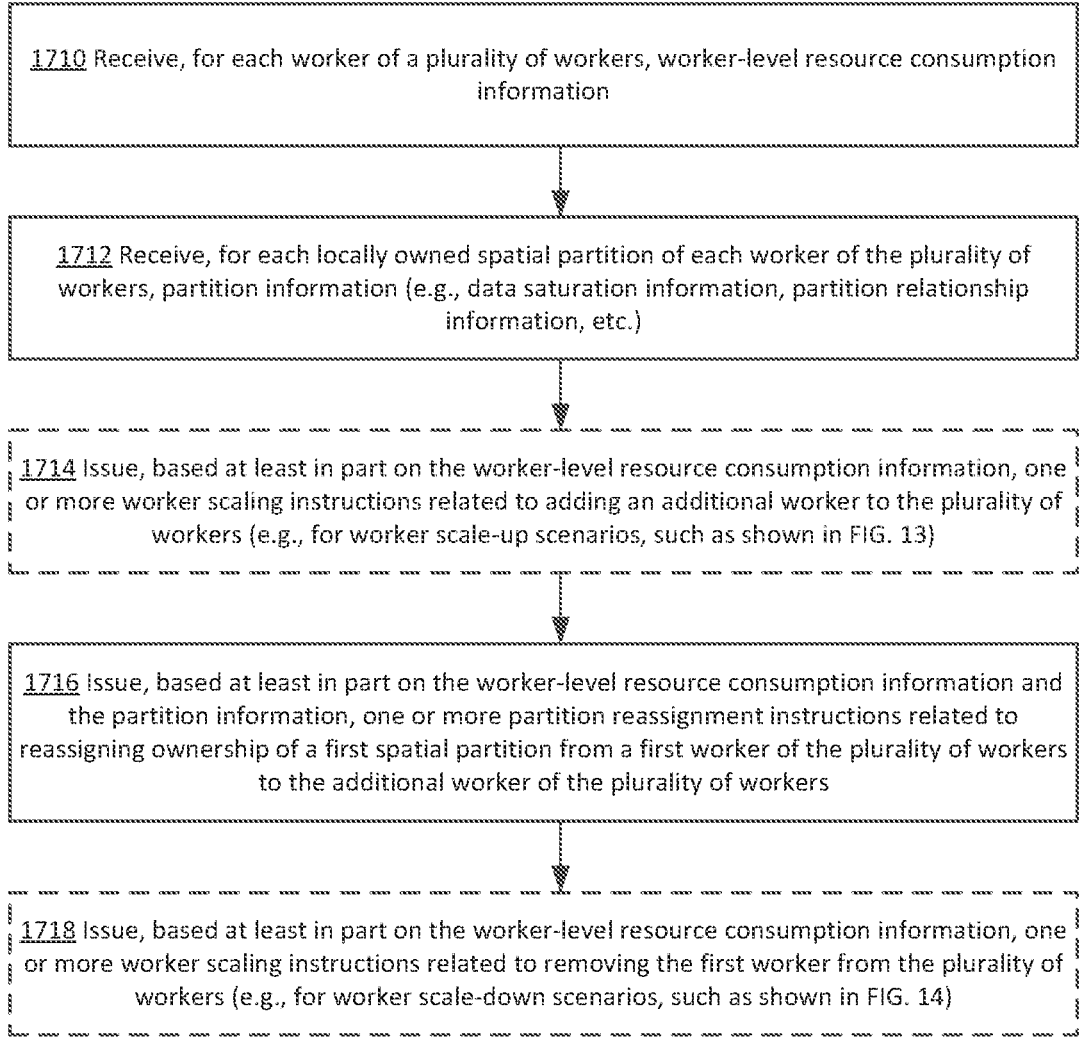

1710 Receive, for each worker of a plurality of workers, worker-level resource consumption information 1712 Receive, for each locally owned spatial partition of each worker of the plurality of workers, partition information (e.g., data saturation information, partition relationship information, etc.)

1714 Issue, based at least in part on the worker-level resource consumption information, one or more worker scaling instructions related to adding an additional worker to the plurality of workers (e.g., for worker scale-up scenarios, such as shown in FIG. 13)

1716 Issue, based at least in part on the worker-level resource consumption information and the partition information, one or more partition reassignment instructions related to reassigning ownership of a first spatial partition from a first worker of the plurality of workers to the additional worker of the plurality of workers 1718 Issue, based at least in part on the worker-level resource consumption information, one or more worker scaling instructions related to removing the first worker from the plurality of workers (e.g., for worker scale-down scenarios, such as shown in FIG. 14)

FIG. 17

SIMULATED SPACE LOCAL PARTITION REASSIGNMENT AND APPLICATION AUTOSCALING

CROSS-REFERENCE TO RELATED APPLICATIONS

This application is related to the following application, which is hereby incorporated by reference in its entirety: U.S. patent application Ser. No. 18/346,069 filed Jun. 30, 2023, entitled "SPATIAL PARTITION SPLITTING AND MERGING". This application is also related to the following application, which is also hereby incorporated by reference in its entirety: U.S. patent application Ser. No. 18/346, 050 filed Jun. 30, 2023, entitled "SIMULATED SPACE REMOTE PARTITION REASSIGNMENT AND WORKER AUTOSCALING".

BACKGROUND

A simulated space is a virtual simulation of a spatial environment. One common use of a simulated space is a video game in which the simulated space corresponds to a game world in which the game is played. In some examples, state data associated with the simulated space may be generated, maintained, updated, and replicated. One example of this state data corresponds physics characteristics of entities (e.g., characters, vehicles, animals, weather and natural entities, etc.) that move throughout the simulated space. As game worlds and other simulated spaces become more elaborate and complex, greater amounts of resources are required to manage these simulated spaces. One strategy for management of a simulated space is to divide the space into a group of sub-spaces, which are referred to herein as spatial partitions. These spatial partitions may be assigned to a group of applications, which may be distributed across a group of computing instances referred to herein as workers. It may often be necessary to transmit state data between different spatial partitions, such as to assist in maintaining state in scenarios in which entities travel across different spatial partitions. Due to these and other complexities, the management of computing resources corresponding to a simulated space may present many challenges.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 15 is a flowchart illustrating an example local spatial partition reassignment and application autoscaling process that may be used in accordance with the present description.

FIG. 16 is a flowchart illustrating an example spatial partition manipulation process that may be used in accordance with the present description.

FIG. 17 is a flowchart illustrating an example remote spatial partition reassignment and worker autoscaling process that may be used in accordance with the present description.

DETAILED DESCRIPTION

Figure 1:
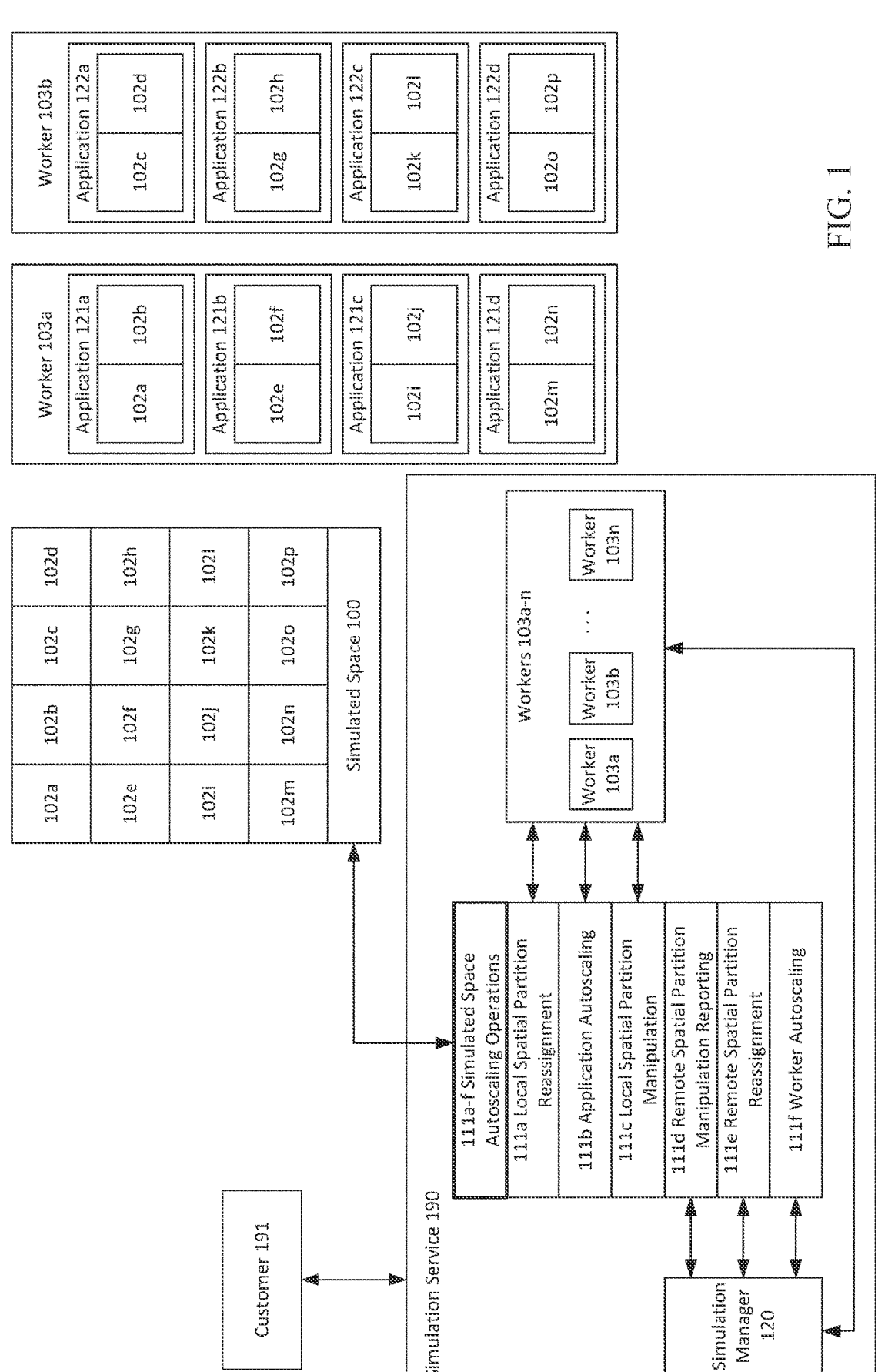
FIG. 1 is a diagram illustrating an example simulated space autoscaling system that may be used in accordance with the present description.

Techniques for simulated space autoscaling operations are described herein. The techniques described herein may be employed in connection with a simulated space, which is a virtual simulation of a spatial environment. In one specific example, a simulated space may be a virtual space in which a video game is played. State data associated with the simulated space may be generated, maintained, updated, and replicated. In one specific example, the state data may correspond to physics characteristics of entities (e.g., characters, vehicles, animals, weather and natural entities, etc.) that move throughout the simulated space. The simulated space may be divided into a group of sub-spaces, which are referred to herein as spatial partitions. These spatial partitions may be assigned to a group of applications, which may be distributed across a group of computing instances referred to herein as workers. State data may be transmitted between different spatial partitions, such as to assist in maintaining state in scenarios in which entities travel across different spatial partitions. For example, in some cases, state data may be transmitted from a given spatial partition to each other spatial partition that neighbors the given spatial partition. Also, in some examples, state data may also be transmitted from a given spatial partition to one or more other spatial partitions that share a designated relationship with the given spatial partition for which state data transmission is advantageous. In one specific example, a first spatial partition may include a virtual camera, and a second spatial partition may include a display that displays video captured by the virtual camera. In this example scenario, it may be advantageous to transmit state data from the first spatial partition to the second spatial partition.

In at least some conventional spatial simulation systems, at least some assignments related to partitions, applications and workers may be static, meaning that they may be made at the beginning of execution of the simulation and may remain unchanged. For example, in at least some conventional spatial simulation systems, spatial partitions may not be reassigned between applications and/or workers, application quantities on a worker may remain fixed, spatial partitions may not be split or merged, and/or the quantities of workers used to implement the simulation may remain fixed. This may cause problems when load on the simulation is increased, such as because the resources used to implement the simulation may be insufficient to handle the increased load. Additionally, static assignments may be inefficient because they may not be capable of being rearranged to handle redistributions in load, such as when entities move from certain partitions to other partitions. Furthermore, when load is decreased, static systems may also be inefficient because they may unnecessarily continue to employ underutilized resources that could be more efficiently repurposed, thereby unnecessarily increasing costs and complexities of the system. The techniques described herein may reduce these and other problems, such as by allowing dynamic changes to partitions, applications and workers during execution of the spatial simulation as described in detail below.

The techniques described herein include local spatial partition reassignment, which refers to reassignment of spatial partitions between applications on the same worker, such as dynamically during execution of a spatial simulation. A worker may receive application workload information relating to a workload status of each application executing on the worker. In some examples, the application workload information may be provided by each application to the worker and updated repeatedly, for example at a set time interval. The application workload information may be used to determine whether a respective application is overloaded, healthy, or underutilized. In some examples, when a given application is overloaded, the workload on the application may be reduced by reassigning a spatial partition from the overloaded application to another application on the same worker. For example, the worker may first attempt to reassign the spatial partition from an overloaded application to an underutilized application. If there are no underutilized applications on the worker, the worker may then attempt to reassign the spatial partition from an overloaded application to a healthy application. In some examples, the worker may send a signal to the application from which the spatial partition is being reassigned to indicate that the application has lost ownership of the spatial partition. Additionally, the worker may send a signal to the application to which the spatial partition is being reassigned to indicate that the application has gained ownership of the spatial partition. In some examples, the spatial partition reassignments may be subject to certain rules, such as a minimum required time period between reassignments. This may prevent confusion and system gridlock resulting from too frequent reassignment of spatial partitions. Other example rules are described in detail below.

The techniques described herein may also include application autoscaling, which refers to the ability to automatically and dynamically change a quantity of applications executing on a given worker during execution of a spatial simulation, such as by dynamically adding, or removing, applications to, or from, the worker. For example, in some cases, when a given application is overloaded and when no other applications on the same worker are underutilized, then a determination may be made to add an application to the worker. By contrast, in some cases, when no spatial partitions are assigned to a given application and at least one other application on the same worker is underutilized, then a determination may be made to remove the given application from the worker. Additionally, in some examples, a worker may attempt to stack spatial partitions onto some applications in order to cause other underutilized applications to have no remaining spatial partitions, thereby allowing those other underutilized applications to be removed from the worker. In some examples, the application autoscaling may be subject to certain rules, such as a configurable maximum and/or minimum quantity of applications that are permitted to execute on a given worker.

The techniques described herein also include local spatial partition manipulation, which refers to the ability to split and/or merge spatial partitions on a given worker, such as dynamically during execution of a spatial simulation. For example, in some cases, a parent spatial partition may be split into a set of child spatial partitions that are each smaller than the parent spatial partition. Additionally, a set of child spatial partitions may be merged into a parent spatial partition that is larger than each of the child spatial partitions. In some examples, a worker may receive spatial partition data saturation information for each spatial partition on the worker. In some examples, the spatial partition data saturation information may be provided by each application to the worker and updated repeatedly, for example at a set time interval. The spatial partition data saturation information may be used to determine whether a respective spatial partition requires splitting, has an acceptable amount of data saturation, or is available for merging. For example, in some cases, a spatial partition may become highly crowded, such as after a large quantity of entities have moved into the spatial partition. In this scenario, the highly crowded spatial partition may require splitting. By contrast, in some cases, a spatial partition may become less crowded, such as after a large quantity of entities have moved out of the spatial partition. In this scenario, the less crowded spatial partition may be available for merging. In some examples, if a given spatial partition is determined to require splitting, then a worker may attempt to split the spatial partition subject to certain rules. For example, these rules may include a maximum depth, which refers to a maximum quantity of ancestors that are permitted to be split in order to form a child spatial partition. The rules may also include a maximum quantity of partition slots, which refers to a maximum quantity of partitions that are permitted to be allocated to a given worker. Additionally, in some examples, if all child partitions of the same former parent partition are determined to be available for merging and are assigned to the same application, then the worker may merge the child partitions back into the parent partition. By contrast, for scenarios in which all child partitions of the same former parent partition are determined to be available for merging but are not assigned to the same application, then the child partitions may not be merged until they are co-located together on the same application. For example, in some cases, the local spatial partition reassignment techniques described herein may be employed in order to reassign one or more of the child spatial partitions to the same application as the other child spatial partitions and cause them to be co-located together on the same application. In some examples, in order to assist in performance of partition merging operations, a collection of partition metadata may be generated and associated with each child spatial partition. The partition metadata may include information associated with a respective child spatial partition, such as an identifier of the oldest ancestor partition from which the child partition descends, a depth (which refers to a quantity of ancestor partition(s) that were split in order to create the child partition), an identifier of the parent partition from which the child partition directly descends, and an indication of a quantity of child partitions that directly descend from the parent partition (including the given child spatial partitions and its sibling partitions). The techniques described herein may allow a given spatial partition to be split to two or more levels of depth. For example, a parent partition may be split into a set of first-level child partitions (at a first level of depth). If there are two levels of depth, then one of the first-level child partitions may then be split into a set of second-level child partitions (at a second level of depth). If there are more than two levels of depth, then one of the second-level child partitions may then be split into a set of third-level child partitions (at a third level of depth) and so-on until a maximum allowed level of depth is reached (if there is a maximum allowed level of depth specified).

The techniques described herein also include remote spatial partition manipulation reporting. During remote spatial partition manipulation reporting, indications of local spatial partition manipulations (e.g., splits and merges) that are made on a given spatial partition may be reported, by the given partition, to a simulation manager. The simulation manager may then report the partition manipulations to each other worker associated with the simulated space. This reporting assists the other workers, such as by allowing the other workers to properly identify the manipulated spatial partitions and to properly communicate with those partitions (e.g., to send, and request, state data to, and from, those partitions). In some examples, each worker may submit, to the simulation manager, acceptance requests corresponding to each local spatial partition manipulation that is performed on that worker. The simulation manager may then choose to accept or reject each acceptance request. For example, in some cases, the simulation manager may choose to reject an acceptance request when the corresponding manipulation is a partition split that would cause the global quantity of spatial partitions throughout the entire simulated space to exceed a customer-specified threshold. The simulation manager may periodically issue reports that are broadcast to each worker. Each report may provide an indication of results for acceptance requests that are issued subsequent to the prior report. For example, the report may include an the corresponding manipulation (e.g., an indication of a merge or split operation and the corresponding parent and child partitions), and an indication of whether the acceptance request is accepted or rejected.

The techniques described herein also include remote spatial partition reassignment, which refers to reassignment of spatial partitions between different workers, such as dynamically during execution of a spatial simulation. A worker, as that term is used herein, refers to a computing instance (e.g., a virtual machine instance) configured to host execution of one or more applications that perform acts related to state associated with a spatial simulation. In some examples, each worker may report, to the simulation manager, worker-level resource consumption information and partition information. In some examples, the worker-level resource consumption information and partition information may be updated repeatedly, for example at a set time interval. The worker-level resource consumption information may be used to determine whether a respective worker is overloaded, healthy, or underutilized. For example, each worker may have a selected number of application slots for applications and a selected number of partition slots for spatial partitions. For a given worker, the worker-level resource consumption information may include, for example, indications of how many of the worker's application slots are currently being used by executing applications, indications of how many of the worker's application slots are available for additional applications, indications of how many of the worker's partition slots are currently being used by local spatial partitions, indications of how many of the worker's partition slots are currently being used by remotely-owned replicated spatial partitions, indications of how many of the worker's partition slots are available for additional spatial partitions, breakdowns of data emissions from the worker to other workers (e.g., an egress map with a rolling average based on a selected prior time period), breakdowns of data ingress to the worker from other workers (e.g., an ingress map with a rolling average based on a selected prior time period), and other information. In some examples, a worker may be considered to be overloaded when the quantity of applications that it owns exceeds a configurable threshold and/or when the quantity of spatial partitions that it owns exceeds a configurable threshold. For example, this may occur when the worker has started to use its application buffer space and/or its spatial partition buffer space.

For a given worker, the partition information may include information for each spatial partition owned by the given worker. For a given spatial partition, the partition information may include, for example, indications of data saturation amounts for the spatial partition and partition relationship information indicating one or more other partitions from which each partition receives state data and/or to which each partition sends state data. In some examples, the partition relationship information may include weights indicating spatial proportions of the one or more other partitions from which the partition receives state data. Also, in some examples, the partition relationship information may be used to generate a partition-to-partition dependency graph, which may also be included in the partition information. The partition-to-partition dependency graph may indicate which spatial partitions are receiving data from which other spatial partitions, as well as estimations of the amount of data being transmitted and received between spatial partitions.

In some examples, the simulation manager may use the worker-level resource consumption information and the partition information to determine, if, and when, to perform a remote spatial partition reassignment and to determine the specific spatial partition to reassign and specific workers from which, and to which, to reassign the spatial partition. For example, in some cases, if a given worker is overloaded, then the simulation manager may decide to reassign a spatial partition from the overloaded worker to a worker that is underutilized or healthy. In some examples, the simulation manager may also use the partition information to select a particular spatial partition to reassign from the overloaded worker and to select another worker to which to reassign the spatial partition. For example, in some cases, the simulation manager may use the partition information to determine a resource impact for reassigning each of the spatial partitions from the overloaded worker to another worker. For example, in some cases, it may be determined that a given spatial partition on an overloaded worker is sending large amounts of data to another spatial partition on another worker. In this scenario, there may be a large positive resource impact associated with transferring that spatial partition to the other worker, such as because the amount of data that is transferred between workers may be reduced. Thus, in this scenario, it may be advantageous to transfer that spatial partition to the other worker. Accordingly, in some examples, a resource impact for reassigning a given spatial partition between workers may be determined based on state dependencies associated with the given spatial partition, such as including other spatial partitions on which the given spatial partition has state dependencies and/or other spatial partitions that have state dependencies on the given spatial partition. Additionally, in some examples, a given spatial partition may be selected for reassignment between workers based on state dependencies associated with the given spatial partition, such as including other spatial partitions on which the given spatial partition has state dependencies and/or other spatial partitions that have state dependencies on the given spatial partition.

The techniques described herein also include worker autoscaling, which refers to the ability to automatically and dynamically change a quantity of workers that are used to implement the spatial simulation, such as by dynamically adding, or removing, workers during execution of the spatial simulation. Additional workers may be added in response to increased load, while existing workers may be removed in response to decreased load. For example, in some cases, when one or more workers are overloaded and when no other workers have available capacity to receive additional spatial partitions (e.g., there are no underutilized workers), the simulation manager may determine to add an additional worker to the spatial simulation. By contrast, in some cases, when no spatial partitions are assigned to a given worker, the simulation manager may determine to remove the given worker from the spatial simulation. Additionally, in some examples, the simulation manager may attempt to empty out underutilized workers in order to cause those workers to have no remaining spatial partitions, thereby allowing those workers to be removed from the spatial simulation. When reassigning spatial partitions to newly added workers, and when reassigning spatial partitions from underutilized workers to allow removal of those workers, the simulation manager may also use the partition information to determine a resource impact for reassigning each of the spatial partitions between workers. For example, the simulation manager may use the resource impact determinations to select a particular spatial partition to reassign from an overloaded worker to a new worker. Additionally, the simulation manager may use the resource impact determinations to select one or more other workers to which to reassign spatial partitions from an underutilized worker that is being emptied-out for removal. Thus, in some examples, a given worker from which, and/or to which, to reassign a given spatial partition may be selected based on state dependencies associated with the given spatial partition, such as including other spatial partitions on which the given spatial partition has state dependencies and/or other spatial partitions that have state dependencies on the given spatial partition.

FIG. 1 is a diagram illustrating an example simulated space autoscaling system that may be used in accordance with the present description. In the example of FIG. 1, a simulation service 190 may, on behalf of customer 191, execute a spatial simulation corresponding to a simulated space 100. For example, customer 191 may purchase and/or rent computing resources (e.g., computing instances, memory resources, processing resources, etc.) provided by the simulation service 190 in order to execute the spatial simulation, such as to maintain, update, and modify state data associated with the spatial simulation. The simulated space 100 is divided into spatial partitions 102a-p. While the example of FIG. 1 includes sixteen spatial partitions 102a-p, it is noted that any number of spatial partitions may be used in association with the techniques described herein. Also, in the example of FIG. 1, spatial partitions 102a-p are distributed across eight applications, including applications 121a-d on worker 103a and applications 122a-d on worker 103b. Specifically, spatial partitions 102a-b are assigned to application 121a, spatial partitions 102c-d are assigned to application 122a, spatial partitions 102e-f are assigned to application 121b, spatial partitions 102g-h are assigned to application 122b, spatial partitions 102i-j are assigned to application 121c, spatial partitions 102k-1 are assigned to application 122c, spatial partitions 102m-n are assigned to application 121d, and spatial partitions 1020-p are assigned to application 122d.

The techniques described herein may allow simulated space autoscaling operations 111a-f to be performed, for example by simulation service 190, in association with simulated space 100. In the example of FIG. 1, simulated space autoscaling operations 111a-f include local spatial partition reassignment 111a, application autoscaling 111b, local spatial partition manipulation 111c (e.g., splitting and merging), remote spatial partition manipulation reporting 111d, remote spatial partition reassignment 111e, and worker autoscaling 111f. Each of simulated space autoscaling operations 111a-f is described in detail below. As shown in FIG. 1, workers 103a-n are used to implement a spatial simulation for simulated space 100. For example, in some cases, worker 103n may be added dynamically during execution of simulated space 100. Local spatial partition reassignment 111a, application autoscaling 111b, and local spatial partition manipulation 111c are local operations that may be performed on each of workers 103a-n. Additionally, remote spatial partition manipulation reporting 111d, remote spatial partition reassignment 111e, and worker autoscaling 111f are operations that may be performed by, or with the assistance of, a simulation manager 120. As described in detail below, simulation manager 120 is a computing component that manages the simulated space 100, such as by receiving information from each of workers 103a-n, providing instructions to each of workers 103a-n, and reporting information to workers 103a-n. The simulation manager 120 may include one or more computing instances, such as one or more virtual machine instances, that execute instructions to manage the simulated space and that are hosted by one or more physical hardware computing devices.

Figure 2:
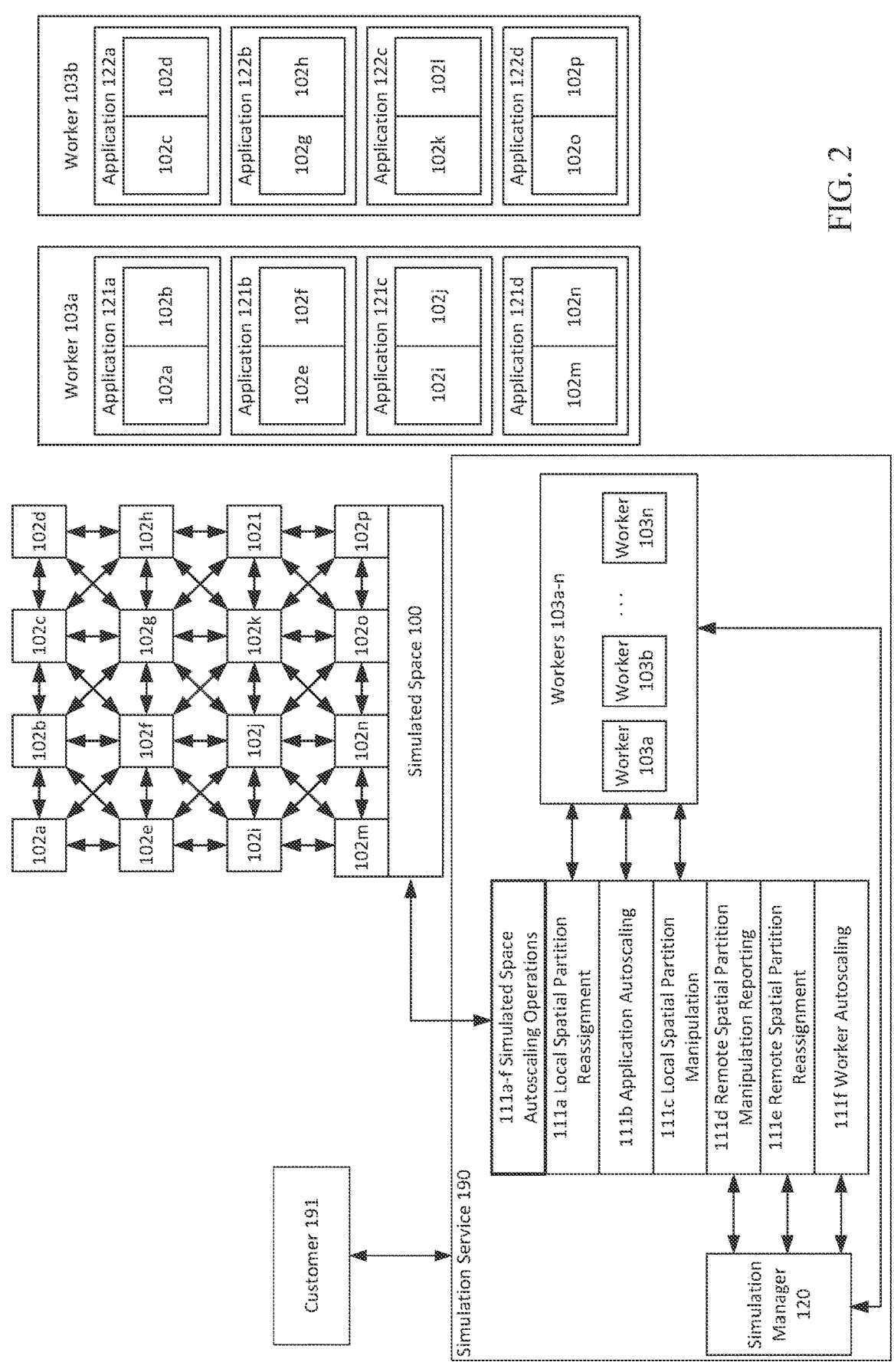
FIG. 2 is a diagram illustrating an example autoscaling system for a simulated space with neighboring partition state dependencies that may be used in accordance with the present description.

Simulated space 100 may be a virtual simulation of a spatial environment. In one specific example, the simulated space 100 may be a virtual space in which a video game is played. State data associated with the simulated space 100 may be generated, maintained, updated, and replicated. In one specific example, the state data may correspond to movements and/or physics characteristics of entities (e.g., characters, vehicles, animals, weather and natural entities, etc.) throughout the simulated space 100. An entity is a virtual object that has a location within the virtual space of the spatial simulation. During execution of the spatial simulation, if the entity moves throughout the simulated space 100, the entity's location may change over time as the entity moves. State data may be transmitted between different spatial partitions 102a-p, such as to assist in maintaining state in scenarios in which entities travel across different spatial partitions 102a-p. For example, in some cases, state data may be transmitted from a given spatial partition to each other spatial partition that neighbors the given spatial partition. Referring now to FIG. 2, an example is shown in which each of spatial partitions 102a-p receives state data from, and sends state data to, each of its neighbors. This is represented in FIG. 2 by the arrows connecting each of spatial partitions 102a-p to each of its neighbors. For example, spatial partition 102f may receive state data from, and provide state data to, each of spatial partitions 102a-c. 102c, 102g and 102i-k.

In some examples, a first spatial partition may have a state dependency on a second spatial partition. This means that an application processing the first spatial partition would require the state corresponding to the second spatial partition to correctly process the first spatial partition. Specifically, a first partition may encode a relationship with a second partition that describes a dependency on it. An application processing the first partition would require the state corresponding to the second partition to correctly process the first partition. For example, state data from the first partition may be orthogonally adjacent to the second partition according to the simulated space. In order to correctly simulate state that exists near the border between the first partition and second partition, the first partition needs the state from the second partition, and the second partition needs the state from the first partition. When the first partition and second partition are co-owned by the same worker, there is no need to replicate the data between workers. By contrast, when the first partition and second partition are owned by different workers, it is necessary to replicate the state data for the first partition to the second worker, as well as replicating state for the second partition to the first worker. In the example of FIG. 2, each of spatial partitions 102a-p has a state dependency on each of its neighbors. For example, spatial partition 102f has a state dependency on each of spatial partitions 102a-c. 102e, 102g and 102i-k. Thus, the arrows shown in FIG. 2 connecting each of spatial partitions 102a-p to its neighbors may represent these state dependencies.

Figure 3:
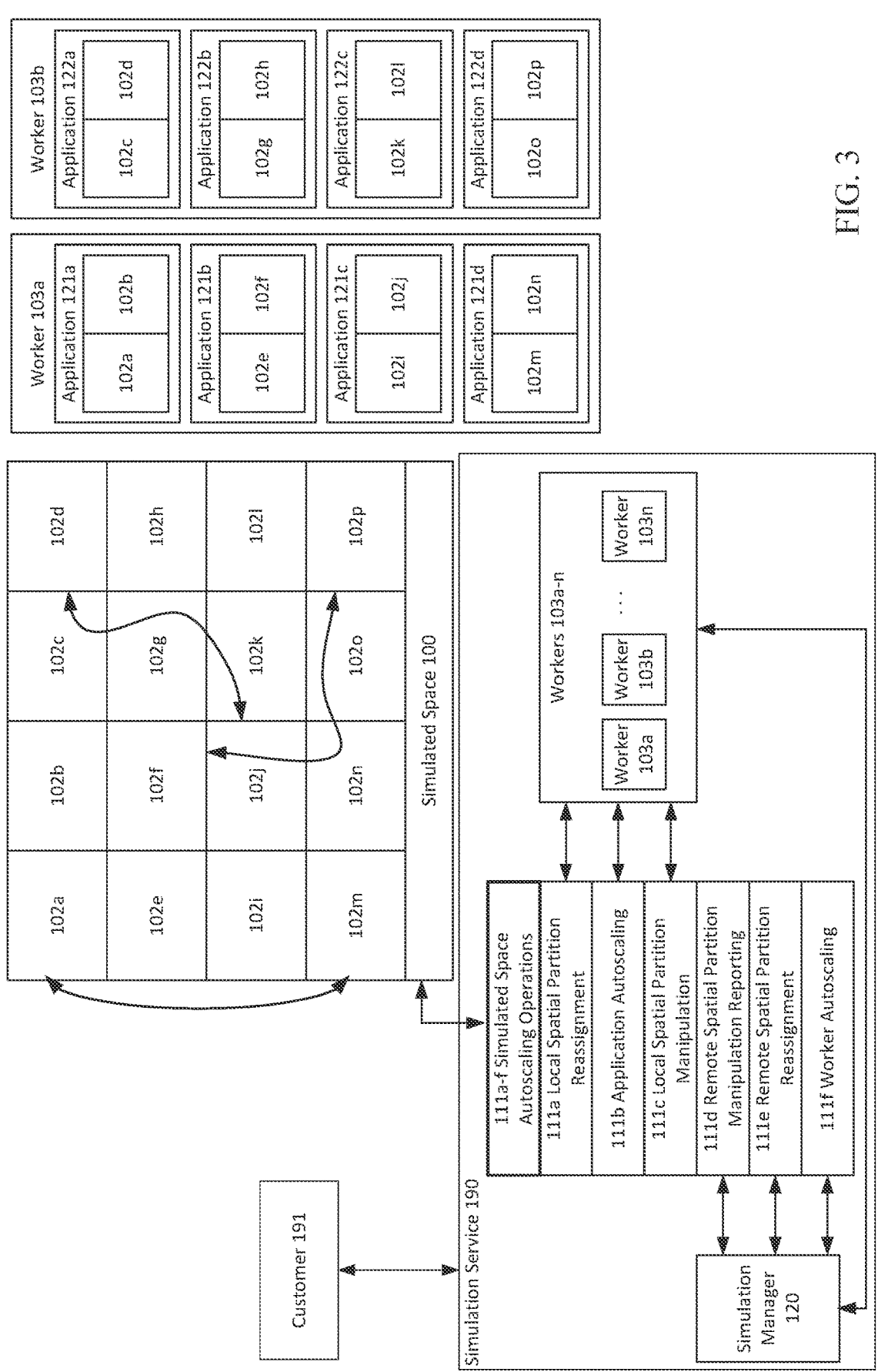
FIG. 3 is a diagram illustrating an example autoscaling system for a simulated space with non-neighboring partition state dependencies that may be used in accordance with the present description.

Also, in some examples, a given spatial partition may have a state dependency on a non-neighboring spatial partition. For example, state data may also be transmitted from a given one of spatial partitions 102a-p to one or more other of spatial partitions 102a-p that share a designated relationship with the given one of spatial partitions 102a-p for which state data transmission is advantageous. In one specific example, a spatial partition 102j may include a virtual camera, and spatial partition 102d may include a display that displays video captured by the virtual camera. Thus, spatial partition 102d may have a state dependency on spatial partition 102j. For example, knowledge of the state of the video captured by the virtual camera in spatial partition 102j may be required in order to correctly display that video in the display of spatial partition 102d. In this example scenario, state data may be transmitted from spatial partition 102j to spatial partition 102d. Referring now to FIG. 3, examples are shown of this type of state dependency between non-neighboring spatial partitions. In the example of FIG. 3, spatial partition 102d and spatial partition 102j have a state dependency on one another (as indicated by the arrow connecting spatial partition 102j and spatial partition 102d). State data may be transmitted between spatial partition 102j and spatial partition 102d. Additionally, spatial partition 102a and spatial partition 102m have a state dependency on one another (as indicated by the arrow connecting spatial partition 102a and spatial partition 102m). State data may be transmitted between spatial partition 102a and spatial partition 102m. Furthermore, spatial partition 102f and spatial partition 102p have a state dependency on one another (as indicated by the arrow connecting spatial partition 102f and spatial partition 102p). State data may be transmitted between spatial partition 102f and spatial partition 102p. It is noted that the types of state dependencies and state data transmission described above and shown in FIGS. 2 and 3 are not mutually exclusive and may be employed in combination with one another. For example, a given spatial partition may have state dependencies on both neighboring and non-neighboring spatial partitions. Also, in some examples, customer 191 may specify and configure rules for which spatial partitions have state dependencies on which other spatial partitions and are to receive state data form which other spatial partitions.

In some examples, a first spatial partition on a first worker may have a state dependency on a second spatial partition on a second worker. In these examples, an application processing the first spatial partition would require the state corresponding to the second spatial partition to correctly process the first spatial partition. Thus, it may be necessary to replicate state data corresponding to the second spatial partition from the second worker to the first worker. This cross-worker state data replication may result in large amounts of data traffic between workers as well increased usage of computing resources, thereby raising the cost and complexity associated with execution of a spatial simulation. For example, as shown in FIG. 2, spatial partition 102f, which is located on worker 103a may have a state dependency on three spatial partitions (spatial partitions 102c. 102g and 102k) that are located on worker 103b. This may result in cross-worker data replication of state data associated with spatial partitions 102c. 102g and 102k from worker 103b to worker 103a. As another example, as shown in FIG. 3, spatial partition 102d, which is located on worker 103b may have a state dependency on spatial partition 102j, which is located on worker 103a. This may result in cross-worker data replication of state data associated with spatial partition 102j from worker 103a to worker 103b. When state data from a first spatial partition on a first worker is transmitted to a second spatial partition on a second worker, this may result in cross-worker data replication of state data from the first worker to the second worker.

In the examples of FIGS. 1-3, simulated space autoscaling operations 111a-f include local spatial partition reassignment 111a. Local spatial partition reassignment 111a refers to reassignment of spatial partitions between applications on the same worker, such as dynamically during execution of a spatial simulation. A worker may receive application workload information relating to a workload status of each application executing on the worker. In some examples, the application workload information may be provided by each application to the worker and updated repeatedly, for example at a set time interval. The application workload information may be used to determine whether a respective application is overloaded, healthy, or underutilized. In some examples, the application workload information may explicitly identify a respective application as being overloaded, healthy, or underutilized. Also, in some examples, the application workload information may include other data that may be used to determine whether the respective application is overloaded, healthy, or underutilized. For example, in some cases, the application workload information may include information about various metrics for a respective application (e.g., success/failure to meet deadlines, total counts of entities in partitions assigned to the application, etc.) that may be used to determine whether the respective application is overloaded, healthy, or underutilized. For example, in some cases, an application may be considered to be overloaded if the total quantity of entities in its assigned spatial partitions meets or exceeds an upper threshold. Also, an application may be considered to be underutilized if the total quantity of entities in its assigned spatial partitions is at or below a lower threshold. Also, an application may be considered to be healthy if the total quantity of entities in its assigned spatial partitions is between the upper and lower thresholds. In some examples, different customers of the simulation service 190 may be able to configure different customer-specific metrics that are to be analyzed, as well as different customer-specific characteristics of those metrics (e.g., upper thresholds, lower thresholds, etc.), that may be analyzed by a worker in order to determine the workload status of respective applications.

Figure 4:
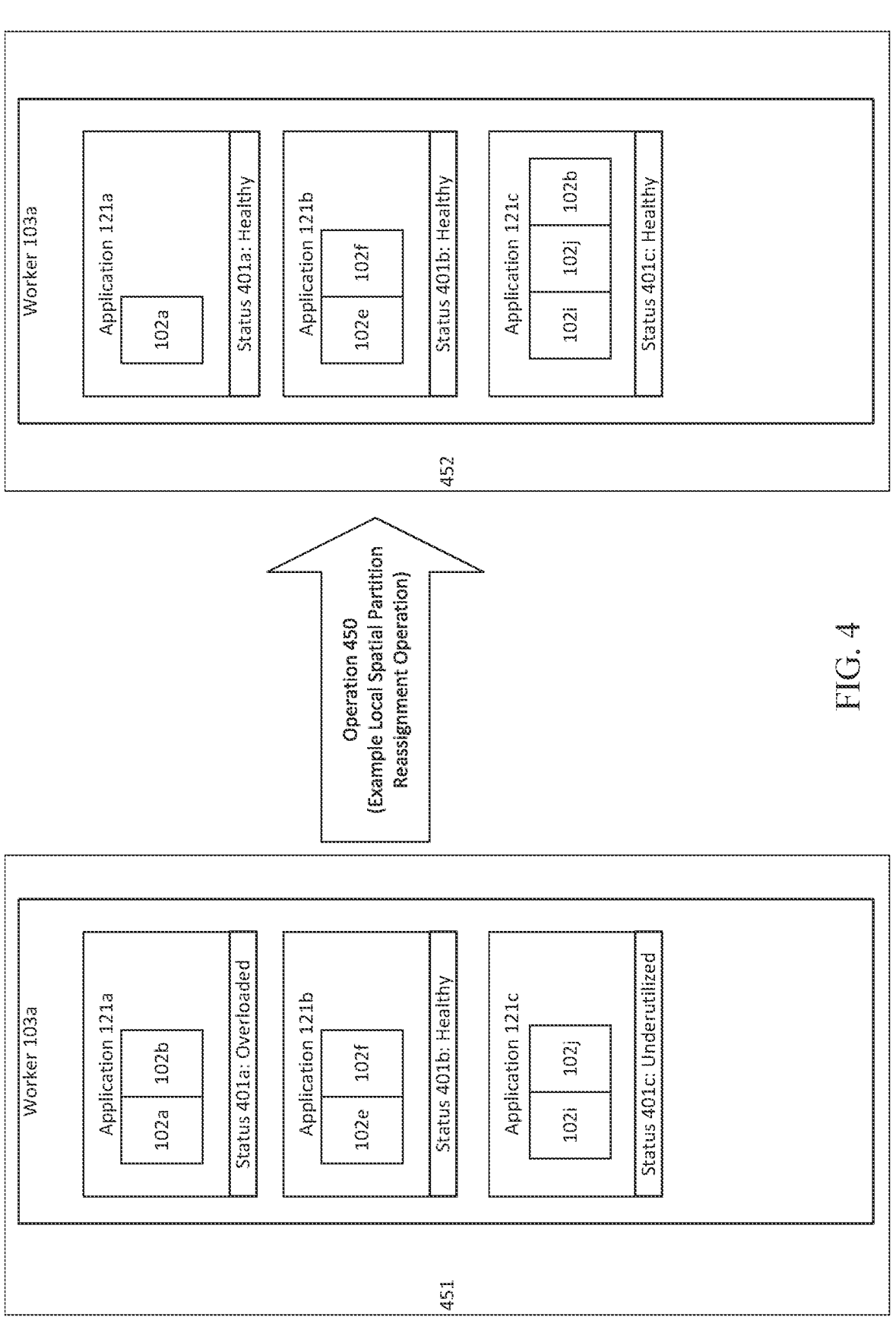
FIG. 4 is a diagram illustrating a first example local spatial partition reassignment that may be used in accordance with the present description.

Referring now to FIG. 4, an operation 450 is shown, which is an example local spatial partition reassignment operation. In the example of FIG. 4, applications 121a-c are executing on worker 103a. Time 451 represents a time prior to performance of operation 450. As shown, at time 451, spatial partitions 102a-b are assigned to application 121a, spatial partitions 102e-f are assigned to application 121b, and spatial partitions 102i-j are assigned to application 121c. Statuses 401a-c represent workload statuses of applications 102a-c, respectively. Specifically, at time 451, application 102a has a status 401a of overloaded, application 102b has a status 401b of healthy, and application 102c has a status 401c of underutilized.

In some examples, when a given application is overloaded, the workload on the application may be reduced by reassigning a spatial partition from the overloaded application to another application on the same worker. In some examples, the worker may first attempt to reassign the spatial partition from an overloaded application to an underutilized application. Also, in some examples, if there are no underutilized applications on the worker, the worker may then attempt to reassign the spatial partition from an overloaded application to a healthy application. In the example of FIG. 4, in order to reduce the workload on application 121a (which is overloaded at time 451), the worker 103a performs operation 450 to reassign spatial partition 102b from application 121a to application 121c (which is underutilized at time 451). Time 452 represents a time after performance of operation 450. As shown, at time 452, spatial partition 102b has been reassigned (via operation 450) from application 121a to application 121c. At time 452, the status 401a of application 121a has changed from overutilized to healthy, such as because the workload of application 121a has been reduced. Additionally, at time 452, the status 401c of application 121c has changed from underutilized to healthy, such as because the workload of application 121c has been increased.

In some examples, a worker may send a signal to an application from which the spatial partition is being reassigned to indicate that the application has lost ownership of the spatial partition. For example, for operation 450 of FIG. 4, worker 103a may send a signal to application 121a to indicate that application 121a has lost ownership of spatial partition 102b. Additionally, the worker may send a signal to the application to which the spatial partition is being reassigned to indicate that the application has gained ownership of the spatial partition. For example, for operation 450 of FIG. 4, worker 103a may send a signal to application 121c to indicate that application 121c has gained ownership of spatial partition 102b. In some examples, the spatial partition reassignments may be subject to certain rules, such as a minimum required time period between reassignments. This may prevent confusion and system gridlock resulting from too frequent reassignment of spatial partitions. These and other example rules may be customer-specific and may be selected by a given customer, for example by customer 191. For example, the customer 191 may select relative placement constraints (e.g., must be rectangular, must be orthogonally connected, etc.) for spatial partitions that are assigned or reassigned to an application, partition count constraints (e.g., no more than ten spatial partitions per application), entity count per application constraints, and others.

In the examples of FIGS. 1-3, simulated space autoscaling operations 111a-f include application autoscaling 111b. Application autoscaling 111b refers to the ability to automatically and dynamically change a quantity of applications executing on a given worker during execution of a spatial simulation, such as by dynamically adding, or removing, applications to, or from, the worker. For example, in some cases, when a given application is overloaded and when no other applications on the same worker are underutilized, then a determination may be made to perform an application scale-up by adding an application to the worker. By contrast, in some cases, when no spatial partitions are assigned to a given application and at least one other application on the same worker is underutilized, then a determination may be made to perform an application scale-down by removing the given application from the worker. Additionally, in some examples, workers may attempt to stack spatial partitions onto some applications in order to cause other underutilized applications to have no remaining spatial partitions, thereby allowing those other underutilized applications to be removed from the worker.

Figure 5:
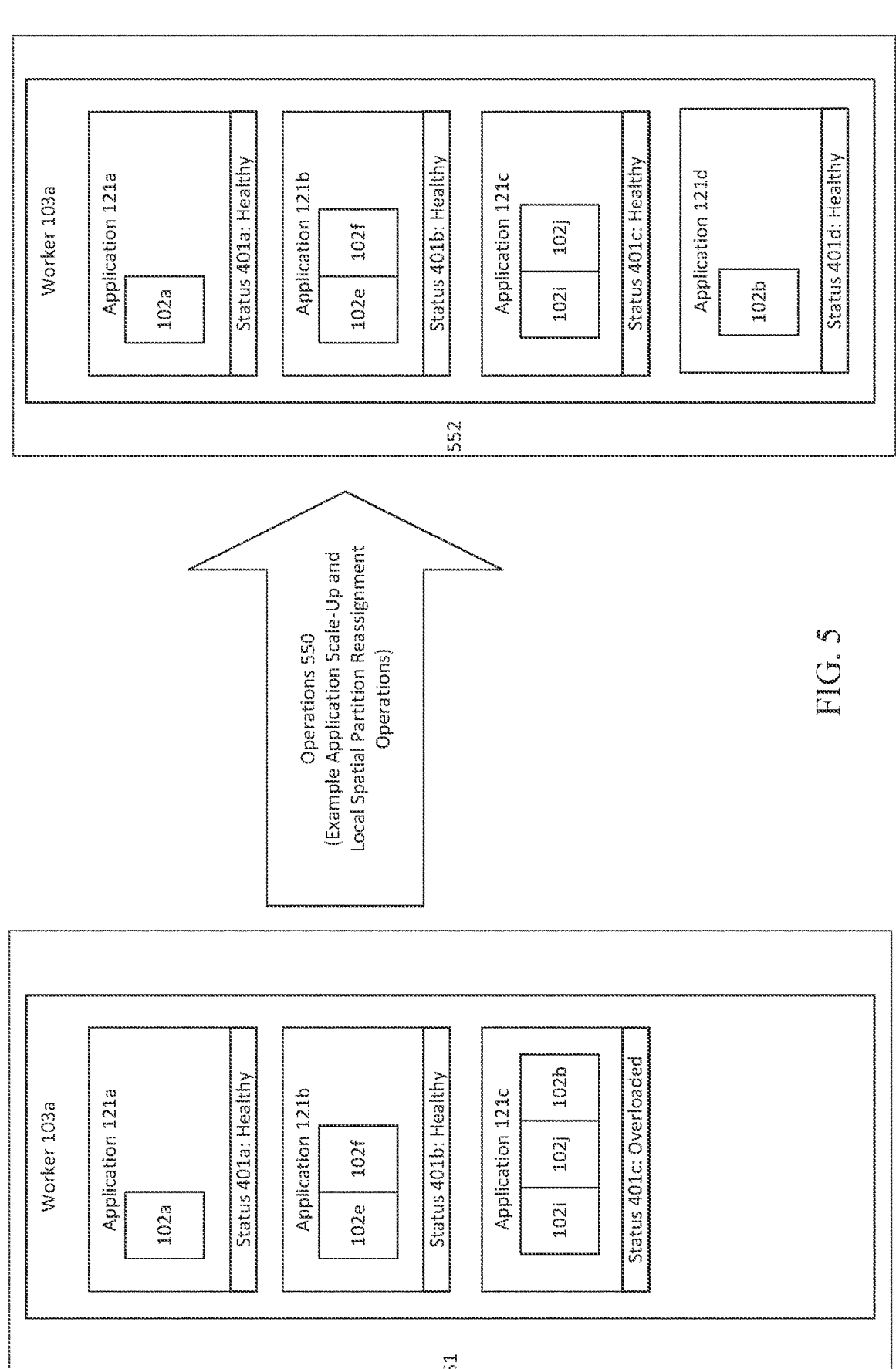
FIG. 5 is a diagram illustrating an example application scale-up with a second example local spatial partition reassignment that may be used in accordance with the present description.

Referring now to FIG. 5, operations 550 are shown, which are example application scale-up and local spatial partition reassignment operations. Time 551 represents a time prior to performance of operations 550. As shown, at time 551, applications 121a-c are executing on worker 103a. Also, at time 551, spatial partition 102a is assigned to application 121a, spatial partitions 102e-f are assigned to application 121b, and spatial partitions 102b and 102i-j are assigned to application 121c. Statuses 401a-c represent workload statuses of applications 102a-c, respectively. Specifically, at time 551, application 102a has a status 401a of healthy, application 102b has a status 401b of healthy, and application 102c has a status 401c of overloaded.

In the example, because application 121c is overloaded and no other existing applications on worker 103a are underutilized at time 551, a determination is made to scale-up and add an additional application to worker 103a via operations 550. Time 552 represents a time after performance of operations 550. As shown, at time 552, application 121d has been added to worker 103a. Also, at time 552, spatial partition 102b has been reassigned from application 121c to application 121d. At time 552, the status 401c of application 121c has changed from overloaded to healthy, such as because the workload of application 121c has been reduced. Additionally, at time 552, application 121d has a status 401d of healthy.

Figure 6:
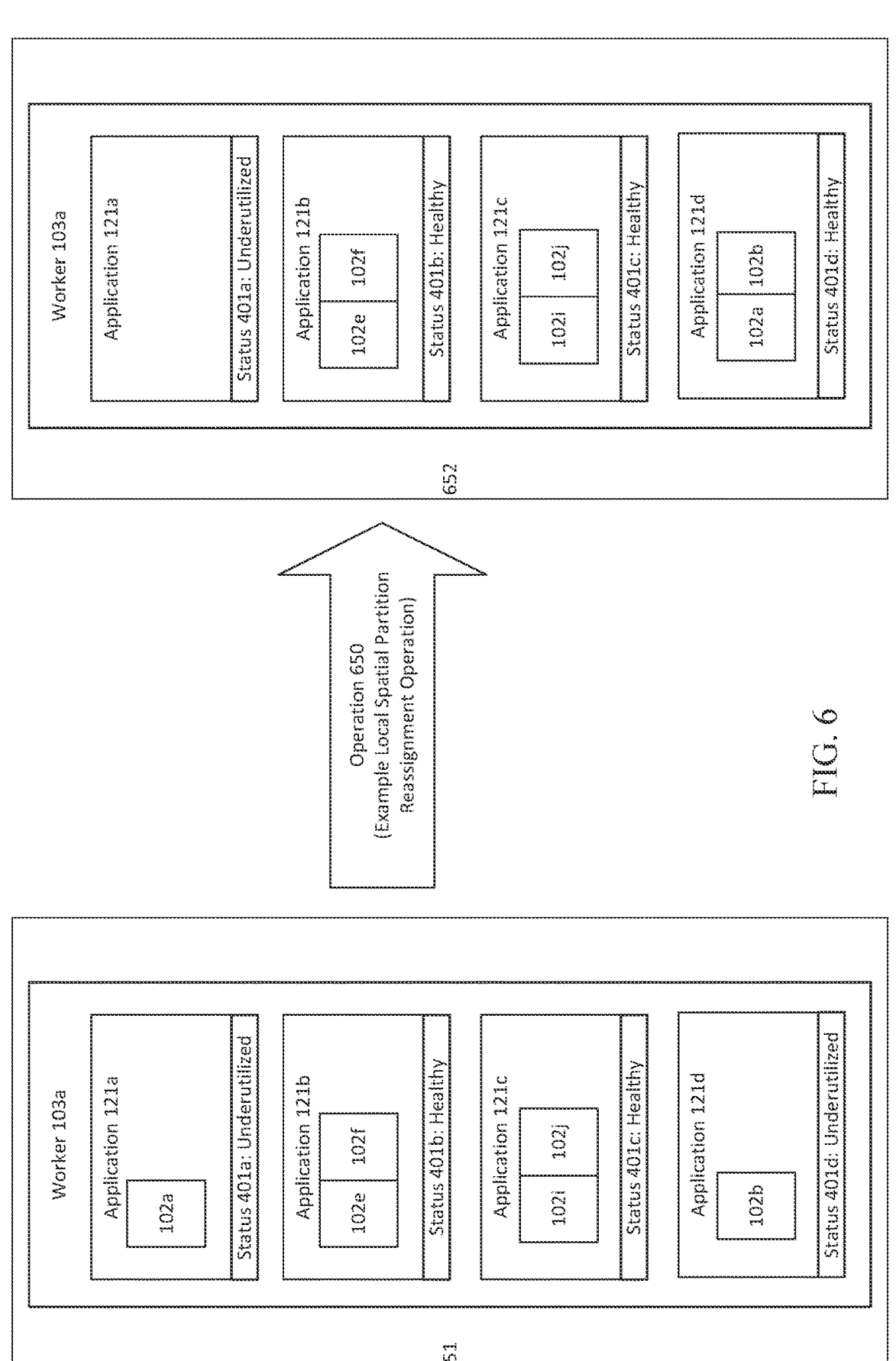
FIG. 6 is a diagram illustrating a third example local spatial partition reassignment that may be used in accordance with the present description.

Referring now to FIG. 6, an operation 650 is shown, which is another example local spatial partition reassignment operation. In the example of FIG. 6, applications 121a-d are executing on worker 103a. Time 651 represents a time prior to performance of operation 650. As shown, at time 651, spatial partition 102a is assigned to application 121a, spatial partitions 102e-f are assigned to application 121b, spatial partitions 102i-j are assigned to application 121c, and spatial partition 102b is assigned to application 121d. Statuses 401a-d represent workload statuses of applications 102a-d, respectively. Specifically, at time 651, application 121a has a status 401a of underutilized, application 121b has a status 401b of healthy, application 121c has a status 401c of healthy, and application 121d has a status 401d of underutilized.

In some examples, a worker may attempt to stack spatial partitions onto some applications in order to cause other underutilized applications to have no remaining spatial partitions, thereby allowing those other underutilized applications to be removed from the worker. In the example of FIG. 6, in order to empty application 121a and allow its eventual removal (see FIG. 7), the worker 103a performs operation 650 to reassign spatial partition 102a from application 121a to application 121d. Time 652 represents a time after performance of operation 650. As shown, at time 652, spatial partition 102a has been reassigned (via operation 650) from application 121a to application 121d. It is noted that application 121a may continue to run successfully even when it does not own any spatial partitions.

Figure 7:
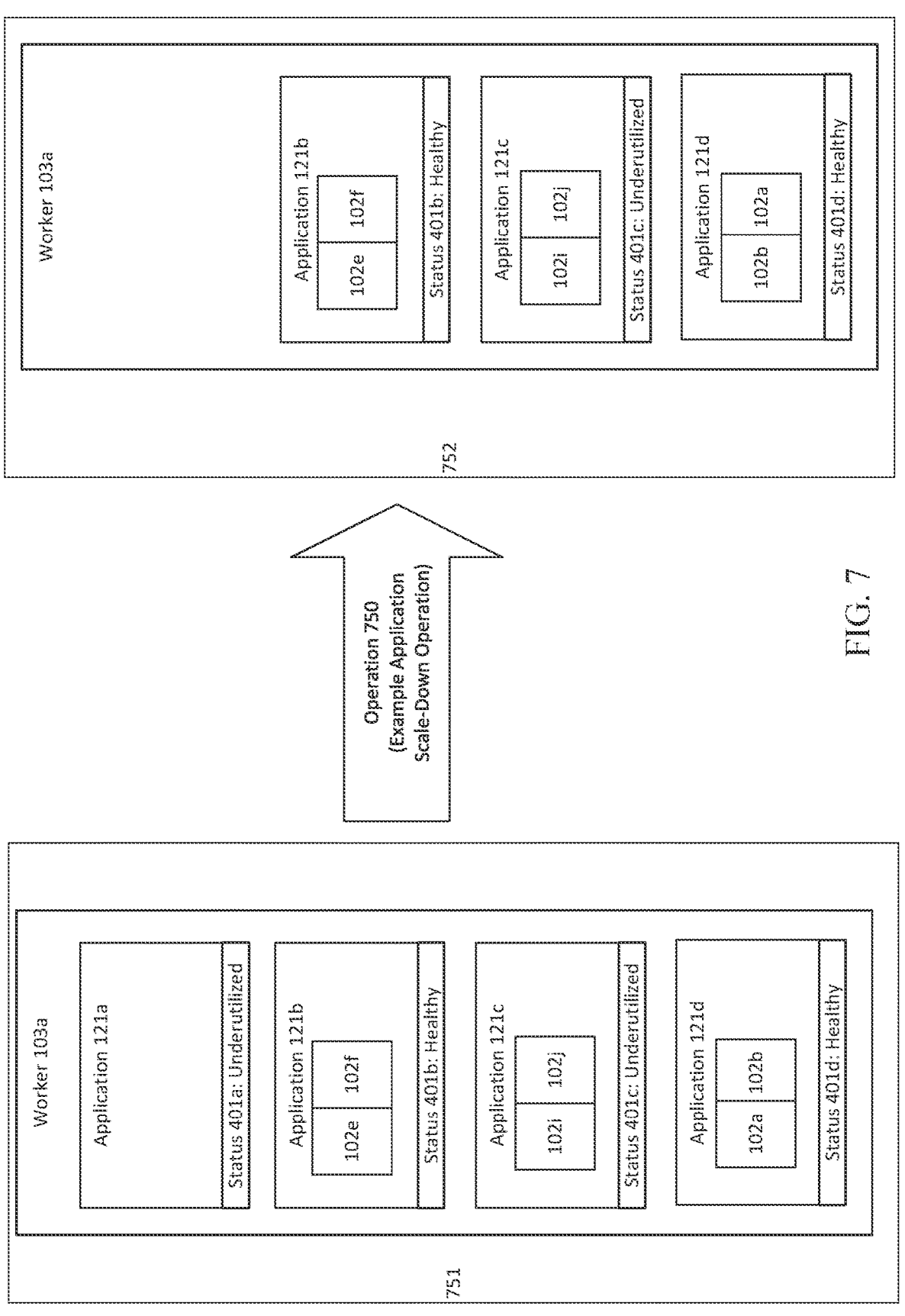
FIG. 7 is a diagram illustrating an example application scale-down that may be used in accordance with the present description.

Referring now to FIG. 7, an operation 750 is shown, which is an example application scale-down operation. Time 751 represents a time prior to performance of operation 750. As shown, at time 751, applications 121a-d are executing on worker 103a. Spatial partitions 102e-f are assigned to application 121b, spatial partitions 102i-j are assigned to application 121c, and spatial partitions 102a-b are assigned to application 121d. There are no spatial partitions assigned to application 121a. Statuses 401a-d represent workload statuses of applications 102a-d, respectively. Specifically, at time 751, application 102a has a status 401a of underutilized, application 102b has a status 401b of healthy, application 102c has a status 401c of underutilized, and application 102d has a status 401d of healthy.

In the example of FIG. 7, because application 121a has no assigned spatial partitions and at least one other application (application 121c) in underutilized, worker 103a performs operation 750 to scale-down and terminate application 121a. Time 752 represents a time after performance of operation 750. As shown, at time 752, spatial partition 102a has been terminated. In some examples, a static set of computing resources (e.g., processing resources, memory resources, etc.) may be allocated to each existing application. By terminating application 121a, the computing resources that are allocated to application 121a may be made available for other more advantageous uses. In some examples, the application autoscaling may be subject to certain rules, such as a configurable maximum and/or minimum quantity of applications that are permitted to execute on a given worker. These and other example rules may be customer-specific and may be selected by a given customer, for example by customer 191.

In some examples, a buffer space may be maintained on each of workers 103a-n for both applications and spatial partitions. The buffer space may give workers 103a-n room to scale-up as needed, as well as providing the simulation manager a signal to rebalance. In some examples, there may be differences in times that are required to implement each of the simulated space autoscaling operations 111a-f. For example, in some cases, local spatial partition reassignment 111a, application autoscaling 111b, and local spatial partition manipulation 111c may be performed relatively quickly because they are local operations that may be performed locally on each of workers 103a-n. By contrast, remote spatial partition reassignment 111e and worker autoscaling 111f require cross-worker coordination and therefore may require more time to implement. Thus, in some examples, workers 103a-n may perform local operations quickly to attempt to address an immediate need (e.g., to mitigate a utilization spike). By using the buffer space, this allows the workers 103a-n to mitigate problems locally first. The workers 103a-n may be required to adhere to the currently-published topology (e.g., which worker owns which partitions) and to report its operations to the simulation manager 120 so it can update the simulation topology across all workers 103a-n. After a worker 103a-n mitigates an issue, it may consume some of its buffer space. The simulation manager 120 may then restore the buffer space by rebalancing the partition-to-worker mappings. If needed, the simulation manager 120 may also acquire additional workers if the load has grown too much. In addition to scaling-up to mitigate a spike, workers 103a-n may also attempt to scale-down when possible. Workers 103a-n may be responsible for optimizing their assigned workload, as well as being aware of when resources can be compressed. For example, if four partitions can potentially be merged due to low utilization, a worker should seek to assign ownership of those partitions to the same application.

Referring back to FIGS. 1-3, it is shown that simulated space autoscaling operations 111a-f may also include local spatial partition manipulation 111c. Local spatial partition manipulation 111c refers to the ability to split and/or merge spatial partitions on a given worker, such as dynamically during execution of a spatial simulation. For example, in some cases, a parent spatial partition may be split into a set of child spatial partitions that are each smaller than the parent spatial partition. Additionally, a set of child spatial partitions may be merged into a parent spatial partition that is larger than each of the child spatial partitions. In some examples, a worker may receive spatial partition data saturation information for each spatial partition on the worker. In some examples, the spatial partition data saturation information may be provided by each application to the worker and updated repeatedly, for example at a set time interval. The spatial partition data saturation information may be used to determine whether a respective spatial partition requires splitting, has an acceptable amount of data saturation, or is available for merging. In some examples, the spatial partition data saturation information may be collected and provided by an application to which a given spatial partition is assigned.

In some examples, the spatial partition data saturation information may explicitly identify a respective spatial partition as requiring splitting, having an acceptable amount of data saturation, or being available for merging. Also, in some examples, the spatial partition data saturation information may include other data that may be used to determine whether the respective spatial partition requires splitting, has an acceptable amount of data saturation, or is available for merging. For example, in some cases, the spatial partition data saturation information may include information about various metrics for a respective spatial partition (e.g., total counts of entities in the spatial partition, counts of entities moving into and/or towards the spatial partition, counts of entities moving out of and/or away from the spatial partition, etc.) that may be used to determine whether the respective spatial partition requires splitting, has an acceptable amount of data saturation, or is available for merging. In one specific example, a spatial partition having at or above an upper threshold of entities may require splitting, a spatial partition having at or below a lower threshold of entities may be available for merging, and a spatial partition that is between the upper and lower thresholds of entities may have an acceptable amount of data saturation. In some examples, different customers of the simulation service 190 may be able to configure different customer-specific metrics that are to be analyzed, as well as different customer-specific characteristics of those metrics (e.g., upper thresholds, lower thresholds, etc.), that may be analyzed by a worker in order to determine whether a respective spatial partition requires splitting, has an acceptable amount of data saturation, or is available for merging.

Figure 8:
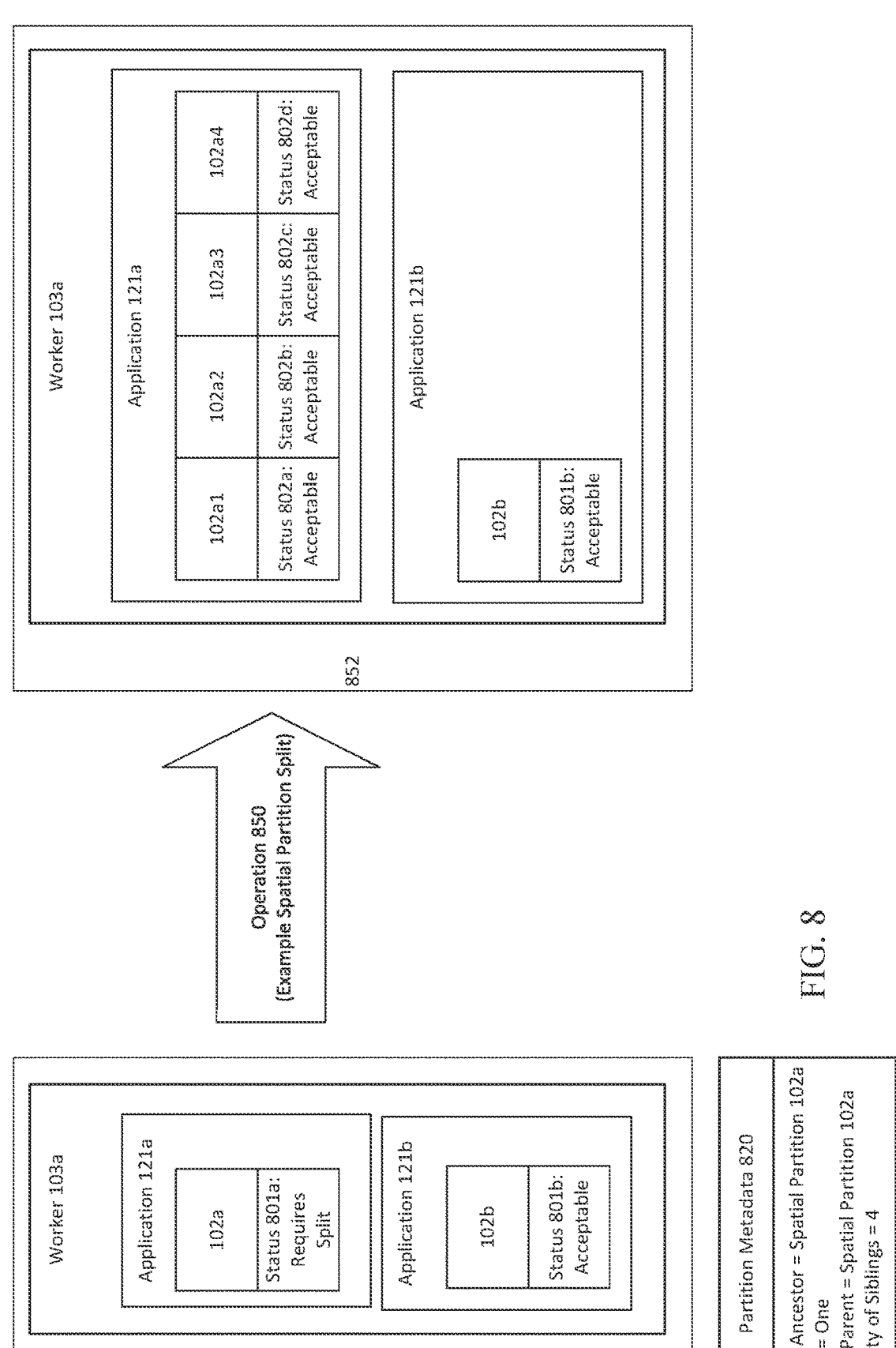
FIG. 8 is a diagram illustrating an example spatial partition split that may be used in accordance with the present description.

In some examples, a spatial partition may become highly crowded, such as after a large quantity of entities have moved into the spatial partition. In this scenario, the highly crowded spatial partition may require splitting. Referring now to FIG. 8, an operation 850 is shown, which is an example spatial partition split operation. Time 851 represents a time prior to performance of operation 850. As shown, at time 851, spatial partition 102*a* is assigned to application 121*a*, and spatial partition 102*b* is assigned to application 121*b*. Statuses 801*a-b* represent data saturation statuses of spatial partitions 102*a-b*, respectively. Specifically, at time 851, spatial partition 102*a* has a status 801*a* of requires split, and spatial partition 102*b* has a status 801*b* of acceptable saturation.

In the example of FIG. 8, because it is oversaturated, spatial partition 102*a* is split into four child partitions, which are spatial partitions 102*a*1-102*a*4. Time 852 represents a time after performance of operation 850. As shown, at time 852, spatial partition 102*a* is split into spatial partitions 102*a*1-102*a*4. Statuses 802*a-d* represent data saturation statuses of spatial partitions 102*a*1-102*a*4, respectively. Specifically, at time 852, spatial partitions 102*a*1-102*a*4 all have a statuses 802*a-d* of acceptable saturation. It is noted that, if application 121*a* should become overloaded, one or more of spatial partitions 102*a*1-102*a*4 may be moved onto another application using the local spatial partition reassignment techniques described above. For example, if application 121*a* should become overloaded, spatial partition 102*a*4 may be moved to application 121*b*.

In some examples, in order to assist in performance of partition merging operations, a collection of partition metadata may be generated and associated with each child spatial partition. In the example of FIG. 8, partition metadata 820 may be generated and associated with spatial partitions 102*a*1-102*a*4, which are children of spatial partition 102*a*. In this example, partition metadata 820 includes an identifier of the oldest ancestor partition from which the spatial partitions 102*a*1-102*a*4 descend, which is spatial partition 102*a*. Partition metadata 820 also includes an indication of a depth (which refers to a quantity of ancestor partition(s) that were split in order to create the child partition). In this example, the depth is one because only one ancestor partition (spatial partition 102*a*) is split to create spatial partitions 102*a*1-102*a*4. Partition metadata 820 also includes an identifier of the parent partition from which the spatial partitions 102*a*1-102*a*4 directly descend, which is spatial partition 102*a*. Partition metadata 820 also includes an indication of a quantity of child partitions that directly descend from the parent partition, which is four.

In some examples, if a given spatial partition is determined to require splitting, then a worker may attempt to split the spatial partition subject to certain rules. For example, these rules may include a maximum depth, which refers to a maximum quantity of ancestor partitions that are permitted to be split in order to create a child partition. The rules may also include a maximum quantity of partition slots, which refers to a maximum quantity of partitions that are permitted to be allocated to a given worker. Additionally, because splits and merges are potentially disruptive to the spatial simulation, a customer may request that a partition split or merge be delayed, such as until performance of a specified operation. The simulation service 190 may then instruct the worker to delay the split or merge based on the request. For example, a partition split may be delayed until performance of a subsequent partition merge operation.

In some cases, a spatial partition may become less crowded, such as after a large quantity of entities have moved out of the spatial partition. In this scenario, the less crowded spatial partition may be available for merging. In some examples, if all child partitions of the same former parent partition are determined to be available for merging and are assigned to the same application, then the worker may merge the child partitions back into the parent partition. By contrast, for scenarios in which all child partitions of the same former parent partition are determined to be available for merging but are not assigned to the same application, then the child partitions may not be merged until they are co-located together on the same application. For example, in some cases, the local spatial partition reassignment techniques described above may be employed in order to reassign one or more of the child spatial partitions to the same application as the other child spatial partitions and cause them to be co-located together on the same application.

Figure 9:
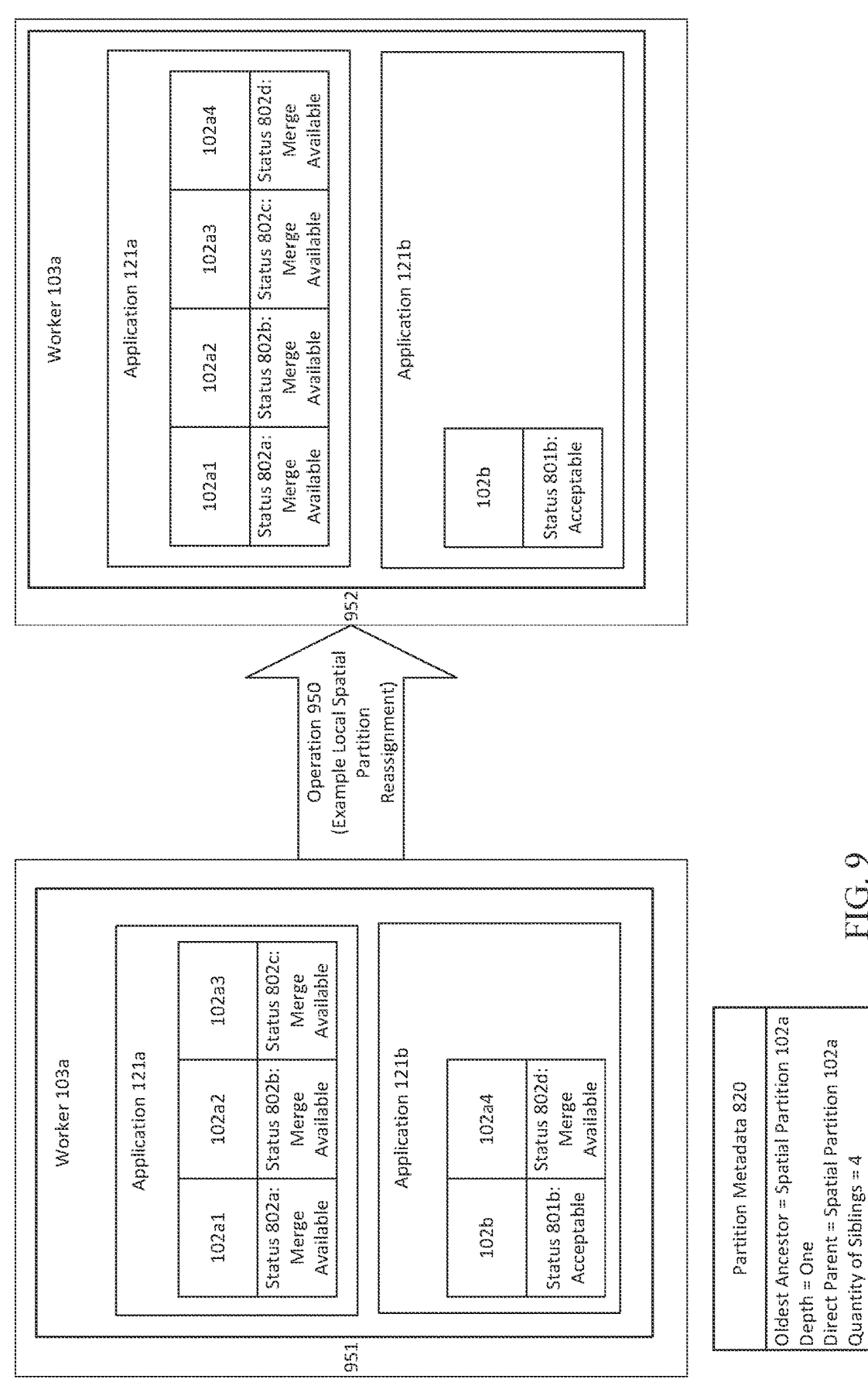
FIG. 9 is a diagram illustrating a fourth example local spatial partition reassignment that may be used in accordance with the present description.

Referring now to FIG. 9, an example is shown in which a child partition may be reassigned from one application to another in order to allow the child partition and its siblings to be merged back into a parent partition. In the example of FIG. 9, an operation 950 is shown, which is an example local spatial partition reassignment operation. Spatial partitions 102*a*1-102*a*4 are all of the siblings of a common parent spatial partition (spatial partition 102*a* of FIG. 8). Time 951 represents a time prior to performance of operation 950. As shown, at time 951, spatial partitions 102*a*1-102*a*3 are assigned to application 121*a*, and spatial partitions 102*b* and 102*a*4 are assigned to application 121*b*. Statuses 802*a-d* represent data saturation statuses of spatial partitions 102*a*1-102*a*4, respectively. Specifically, at time 951, spatial partitions 102*a*1-102*a*4 all have statuses 802*a-d* of merge available. However, at time 951, although spatial partitions 102*a*1-102*a*4 are all available to be merged, the spatial partitions 102*a*1-102*a*4 cannot be immediately merged because they are not assigned to the same application. Specifically, spatial partitions 102*a*1-102*a*3 are assigned to application 121*a*, while spatial partitions 102*a*1-102*a*3 are assigned to application 121*a*.

In the example of FIG. 9, spatial partition 102*a*4 is reassigned from application 121*a* to application 121*b*. Time 952 represents a time after performance of operation 950. As shown, at time 952, spatial partition 102*a*4 has been reassigned from application 121*a* to application 121*b* a4.

In some examples, the merging of child spatial partitions back into a parent spatial partition may be performed based at least in part on partition metadata 820. For example, partition metadata 820 may be employed to assist in merging of spatial partitions 102*a*1-102*a*4 back into spatial partition 102*a*. In some examples, when spatial partition 102*a* is split, the partition metadata 820 may be associated with each of spatial partitions 102*a*1-102*a*4. In some cases, worker 103*a* may use partition metadata 820 to determine that spatial partitions 102*a*1-102*a*4 have a matching parent (spatial partition 102*a*) and form a set of siblings having a quantity (four) that matches the sibling quantity identified in the partition metadata 820. Based at leas in part on this information, worker 103*a* may merge (and/or attempt to merge) spatial partitions 102*a*1-102*a*4 into spatial partition 102*a*.

Figure 10:
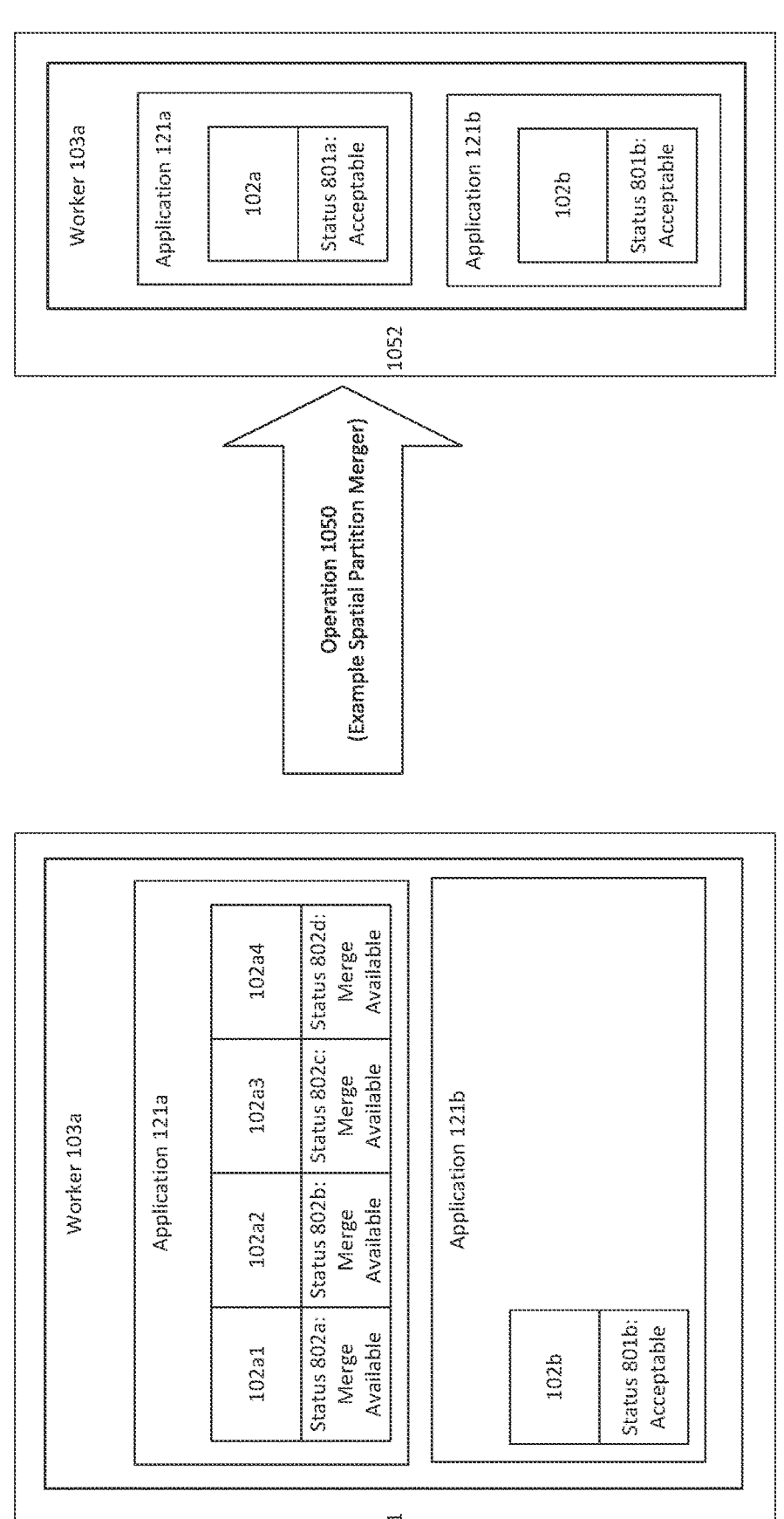
FIG. 10 is a diagram illustrating an example spatial partition merge that may be used in accordance with the present description.

After spatial partition 102*a*4 is reassigned from application 121*a* to application 121*b*, spatial partitions 102*a*1-102*a*4 may be merged back into spatial partition 102*a*. Referring now to FIG. 10, an operation 1050 is shown, which is an example spatial partition merger. Time 1051 represents a time prior to performance of operation 1050. As shown, at time 1051, spatial partitions 102*a*1-102*a*4 are assigned to application 121*a*, and spatial partition 102*b* is assigned to application 121*b*. Statuses 802*a-d* represent data saturation statuses of spatial partitions 102*a*1-102*a*4, respectively. Specifically, at time 1051, spatial partitions 102*a*1-102*a*4 all have statuses 802*a-d* of merge available. Because spatial partitions 102*a*1-102*a*4 are all assigned to application 121*a*, they may now be merged. Time 1052 represents a time after performance of operation 1050. As shown, at time 1052, spatial partitions 102*a*1-102*a*4 are merged back into spatial partition 102*a*. Spatial partition 102*a-b* have a status 801*a-b*, respectively, indicating that they each have an acceptable saturation amount.

Referring back to FIGS. 1-3, it is shown that simulated space autoscaling operations 111*a-f* may also include remote spatial partition manipulation reporting 111*d*. During remote spatial partition manipulation reporting 111*d*, indications of local spatial partition manipulations (e.g., splits and merges) that are made on a given spatial partition may be reported, by the given partition, to a simulation manager. The simulation manager may then report the partition manipulations to each other worker associated with the simulated space. This reporting assists the other workers, such as by allowing the other workers to properly identify the manipulated spatial partitions and to properly communicate with those partitions (e.g., to send, and request, state data to, and from, those partitions).

Figure 11:
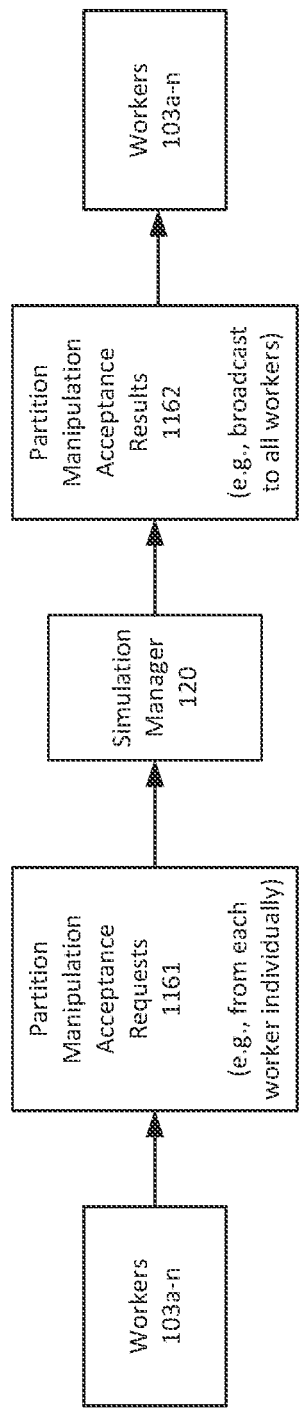
FIG. 11 is a diagram illustrating example spatial partition manipulation reporting that may be used in accordance with the present description.

Referring to FIG. 11, an example of remote spatial partition manipulation reporting 111*d* will now be described in detail. In the example of FIG. 11, each worker 103*a-n* may individually submit, to the simulation manager 120, partition manipulation acceptance requests 1161 corresponding to each local spatial partition manipulation (e.g., splits and merges) that is performed on that worker 103*a-n*. In some examples, each of the partition manipulation acceptance requests 1161 may include an indication of the type of manipulation (e.g., split or merge) and indications of the parent and child partitions involved in the manipulation. The simulation manager 120 may then choose to accept or reject each of the partition manipulation acceptance requests 1161. In some cases, the simulation manager 120 may choose to reject a given one of the partition manipulation acceptance requests 1161 when there is state on other workers that indicates that the corresponding manipulation cannot be accepted. For example, this may occur when a partition split would cause the global quantity of spatial partitions throughout the simulated space 100 to exceed a customer-specified threshold. In some examples, while each worker 103*a-n* may have only a local view of its own spatial partitions, the simulation manager 120 may have a global view of the simulated space 100. The simulation manager 120 may therefore be capable of enforcing global thresholds and limitation across the simulated space 100. In some examples, if the simulation manager 120 determines that a manipulation would not cause violation of any global rules or constraints, then the respective acceptance request may be accepted.

The simulation manager 120 may send partition manipulation acceptance results 1162 to workers 103*a-n*, such as via a broadcast to all of the workers 103*a-n*. In some examples, each of the partition manipulation acceptance results 1162 may include an indication of the type of manipulation (e.g., split or merge), indications of the parent and child partitions involved in the manipulation, and indications of whether the corresponding acceptance request for the manipulation is accepted or rejected. In some examples, the simulation manager 120 may periodically issue reports that are broadcast to each worker 103*a-n*. Each report may provide a group of partition manipulation acceptance results 1162 that have been issued subsequent to the previous report. In some examples, there may be a short time gap between the time that a partition manipulation is locally performed on a given worker and the time at which the manipulation is accepted and reported to other workers. During that time gap, the worker may maintain a record of a mapping between the prior state (prior to performance of the manipulation) and the subsequent state (after performance of the manipulation) of the spatial partitions involved in the manipulation. This may allow the worker to properly route incoming data from other workers to the appropriate spatial partitions until the manipulation is accepted and reported to the other workers.

Figure 12:
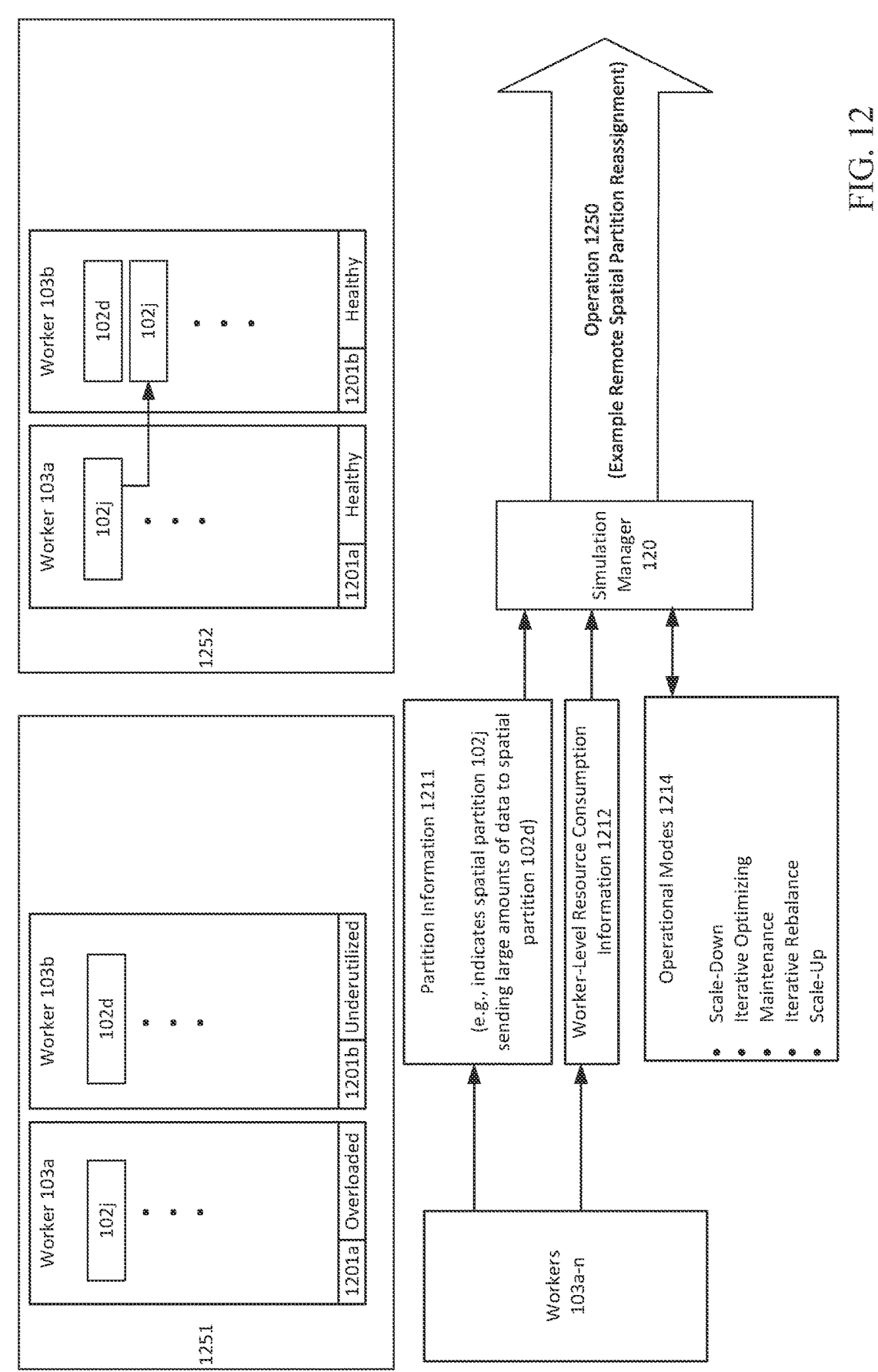
FIG. 12 is a diagram illustrating a first example remote spatial partition reassignment that may be used in accordance with the present description.

Referring back to FIGS. 1-3, it is shown that simulated space autoscaling operations 111*a-f* may also include remote spatial partition reassignment 111*e*. Remote spatial partition reassignment 111*e* refers to reassignment of spatial partitions between different workers, such as dynamically during execution of a spatial simulation. Referring now to FIG. 12, it is shown each of workers 103*a-n* may report, to the simulation manager 120, worker-level resource consumption information 1212 and partition information 1211. In some examples, the worker-level resource consumption information 1212 and partition information 1211 may be updated repeatedly, for example at a set time interval. The worker-level resource consumption information 1212 may be used to determine whether a respective worker is overloaded, healthy, or underutilized. In some examples, the worker-level resource consumption information 1212 may explicitly identify a respective worker as being overloaded, healthy, or underutilized. Also, in some examples, the worker-level resource consumption information 1212 may include other data that may be used to determine whether the respective worker is overloaded, healthy, or underutilized. For example, each worker may have a selected number of application slots for applications and a selected number of partition slots for spatial partitions. For a given worker, the worker-level resource consumption information 1212 may include, for example, indications of how many of the worker's application slots are currently being used by executing applications, indications of how many of the worker's application slots are available for additional applications, indications of how many of the worker's partition slots are currently being used by local spatial partitions, indications of how many of the worker's partition slots are currently being used by remotely-owned replicated spatial partitions, indications of how many of the worker's partition slots are available for additional spatial partitions, breakdowns of data emissions from the worker to other workers (e.g., an egress map with a rolling average based on a selected prior time period), breakdowns of data ingress to the worker to other workers (e.g., an ingress map with a rolling average based on a selected prior time period), and other information. In some examples, a worker may be considered to be overloaded when the quantity of applications that it owns exceeds a configurable threshold and/or when the quantity of spatial partitions that it owns exceeds a configurable threshold. For example, this may occur when the worker has started to use its application buffer space and/or its spatial partition buffer space, such as to mitigate a utilization spike associated with the spatial simulation.

For a given worker, the partition information 1211 may include information for each spatial partition owned by the given worker. For a given spatial partition, the partition information 1211 may include indications of data saturation amounts for the spatial partition. In some examples, the indications of data saturation amounts for the spatial partition may include a value from zero to N that describes how full the partition is. In one specific example, a value of zero may indicate that a partition is empty. Additionally, value of 1.0 may represent the most data one shard can have. Additionally, values greater than 1.0 may also be used to allow for a scenario in which a spatial partition has been split, but the split has not yet been indicated to the simulation manager 120. For example, the value 2.0 may represent the most data two shards can have.

The partition information 1211 may also include partition relationship information (e.g., an ingress map) indicating one or more other partitions from which each partition receives state data and/or to which each partition sends state data. The partition relationship information may include weights indicating spatial proportions of the one or more other partitions from which the partition receives state data. For example, a small weight (e.g., a weight of zero) may indicate that a spatial partition receives state data from only a small portion of another spatial partition. By contrast, a large weight (e.g., a weight of 1.0) may indicate that a spatial partition receives state data from a large portion, or all, of another spatial partition. In some examples, it may be difficult to determine an exact amount of data that is being replicated from one spatial partition to another, and weighting of spatial proportions in this manner may provide an effective estimation of the amount of data that is being transmitted. Also, in some examples, the partition relationship information may be used to generate a partition-to-partition dependency graph, which may also be included in the partition information 1211. The partition-to-partition dependency graph may indicate which spatial partitions are receiving data from which other spatial partitions, as well as estimations of the amount of data being transmitted and received between spatial partitions.

In some examples, the simulation manager 120 may use the worker-level resource consumption information 1212 and the partition information 1211 to determine, if, and when, to perform a remote spatial partition reassignment, and also determine the spatial partition to reassign and specific workers from which, and to which, to reassign the spatial partition. For example, in some cases, if a given worker is overloaded, then the simulation manager 120 may decide to reassign a spatial partition from the overloaded worker to a worker that is underutilized or healthy. In some examples, the simulation manager 120 may also use the partition information 1211 to select a particular spatial partition to reassign from the overloaded worker and to select another worker to which to reassign the spatial partition. For example, in some cases, the simulation manager 120 may use the partition information 1211 to determine a resource impact for reassigning each of the spatial partitions from the overloaded worker to another worker. For example, in some cases, it may be determined that a given spatial partition on an overloaded worker is sending large amounts of data to another spatial partition on another worker. In this scenario, there may be a large positive resource impact associated with transferring that spatial partition to the other worker, such as because the amount of data that is transferred between workers may be reduced. Thus, in this scenario, it may be advantageous to transfer that spatial partition to the other worker.

FIG. 12 shows an example in which an operation 1250 is performed, which is an example remote spatial partition reassignment operation. In this example, worker 103a is overloaded, and operation 1250 is performed to move spatial partition 102j from worker 103a to worker 103b in order to reduce the operational load on worker 103a. Specifically, time 1251 represents a time prior to performance of operation 1250. As shown, at time 1251, worker 103a includes spatial partition 102j (as well as any number of other spatial partitions that are not shown in FIG. 12). Additionally, worker 103b includes spatial partition 102d (as well as any number of other spatial partitions that are not shown in FIG. 12). Statuses 1201a-b represent resource consumption statuses of workers 102a-b, respectively. Specifically, at time 1251, worker 103a has a status 1201a of overloaded, and worker 103b has a status 1201b of underutilized.

Time 1252 represents a time subsequent to performance of operation 1250. As shown, at time 1252, spatial partition 102j has been moved from worker 103a to worker 103b in order to reduce the operational load on worker 103a. Additionally, at time 1252, worker 103a has a status 1201a of healthy, and worker 103b also has a status 1201b of healthy. In this example, the partition information 1211 may indicate that spatial partition 102j is sending large amounts of data to spatial partition 102d. Based on this information, the simulation manager may determine that it would be advantageous to have spatial partitions 102j and 102d located together on the same worker, such as to reduce the amount of data that needs to be replicated between workers. Thus, the simulation manager may select spatial partition 102j (e.g., as opposed to another spatial partition on worker 103a) to transfer to worker 103b. By moving spatial partition 102j to worker 103b, the simulation manager may reduce the load on worker 103a and also reduce the amount of data that is transferred between workers 103a and 103b.

Referring back to FIGS. 1-3, it is shown that simulated space autoscaling operations 111a-f may also include worker autoscaling 111f, which refers to the ability to automatically and dynamically change a quantity of workers that are used to implement the spatial simulation, such as by dynamically adding, or removing, workers during execution of the spatial simulation. Additional workers may be added in response to increased load, while existing workers may be removed in response to decreased load. For example, in some cases, when one or more workers are overloaded and when no other workers have available capacity to receive additional spatial partitions (e.g., there are no underutilized workers), the simulation manager 120 may determine to add an additional worker to the spatial simulation. By contrast, in some cases, when no spatial partitions are assigned to a given worker, the simulation manager 120 may determine to remove the given worker from the spatial simulation. Additionally, in some examples, the simulation manager 120 may attempt to empty out underutilized workers in order to cause those workers to have no remaining spatial partitions, thereby allowing those workers to be removed from the spatial simulation. When reassigning spatial partitions to newly added workers, and when reassigning spatial partitions from underutilized workers to allow removal of those workers, the simulation manager 120 may also use the partition information 1211 to determine a resource impact for reassigning each of the spatial partitions between workers. For example, the simulation manager 120 may use the resource impact determinations to select a particular spatial partition to reassign from an overloaded worker to a new worker. Additionally, the simulation manager may use the resource impact determinations to select one or more other workers to which to reassign spatial partitions from an underutilized worker that is being emptied-out for removal.

Figure 13:
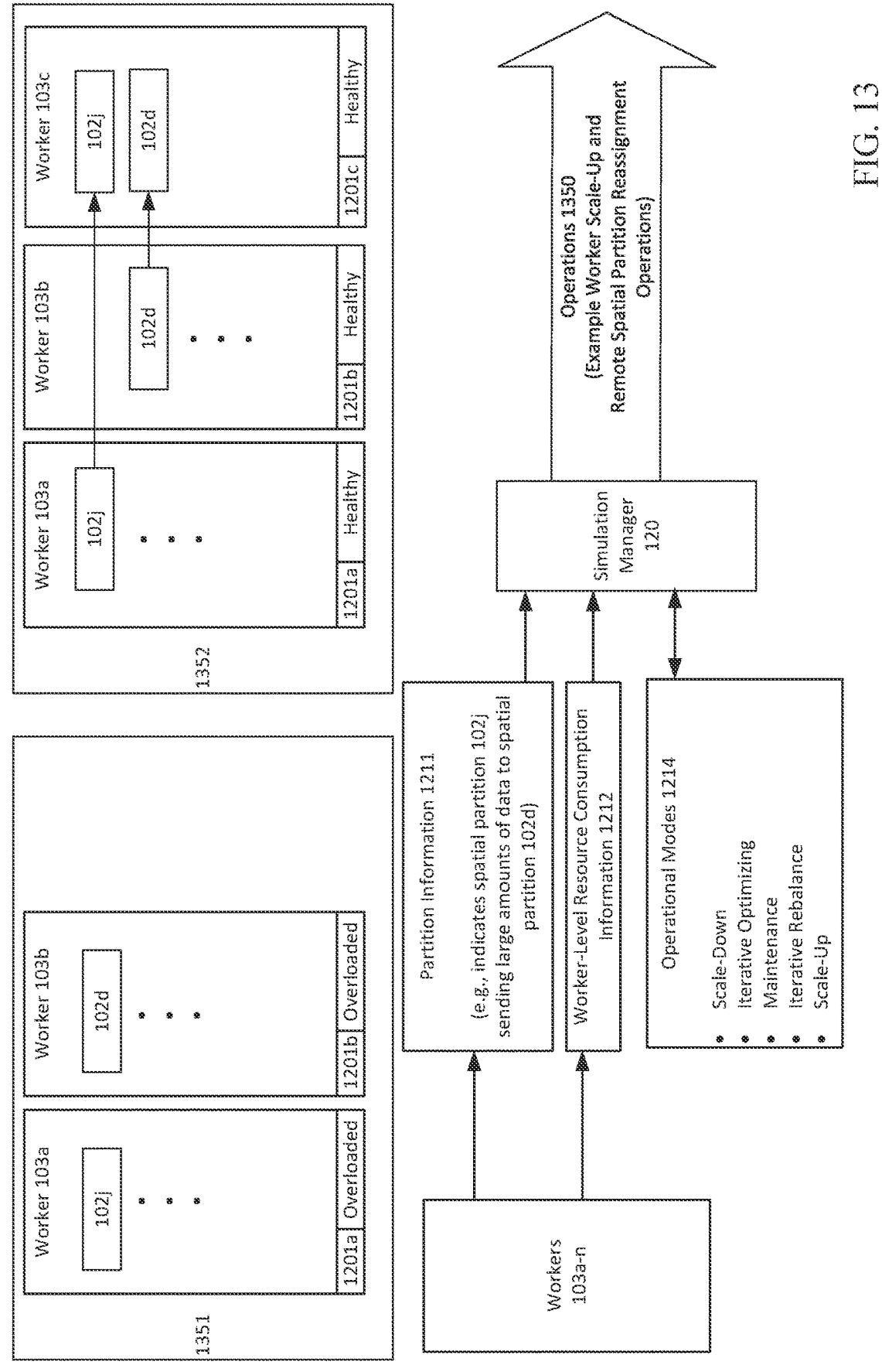
FIG. 13 is a diagram illustrating an example worker scale-up with a second example remote spatial partition reassignment that may be used in accordance with the present description.

FIG. 13 shows an example in which operations 1350 are performed, which are example worker scale-up and remote spatial partition reassignment operations. Specifically, time 1351 represents a time prior to performance of operations 1350. As shown, at time 1351, worker 103*a* includes spatial partition 102*j* (as well as any number of other spatial partitions that are not shown in FIG. 13). Additionally, worker 103*b* includes spatial partition 102*d* (as well as any number of other spatial partitions that are not shown in FIG. 13). Statuses 1201*a-b* represent resource consumption statuses of workers 102*a-b*, respectively. Specifically, at time 1351, worker 103*a* has a status 1201*a* of overloaded, and worker 103*b* has a status 1201*b* of overloaded. Additionally, at time 1351, worker-level resource consumption information 1212 may indicate that no other existing workers have available capacity to receive additional spatial partitions (e.g., there are no underutilized workers). Based on this information, simulation manager 120 may determine to perform a worker scale-up to add an additional worker (worker 103*c*) to the spatial simulation.

Time 1352 represents a time subsequent to performance of operations 1350. As shown, at time 1352, worker 103*c* has been added to the spatial simulation. Additionally, at time 1352, spatial partition 102*j* has been moved from worker 103*a* to worker 103*c* in order to reduce the operational load on worker 103*a*. Additionally, at time 1352, spatial partition 102*d* has been moved from worker 103*b* to worker 103*c* in order to reduce the operational load on worker 103*b*. Also, at time 1352, worker 103*a* has a status 1201*a* of healthy, worker 103*b* has a status 1201*b* of healthy, and worker 103*b* also has a status 1201*b* of healthy. In this example, the partition information 1211 may indicate that spatial partition 102*j* is sending large amounts of data to spatial partition 102*d*. Based on this information, the simulation manager may determine that it would be advantageous to have spatial partitions 102*j* and 102*d* located together on the same worker, such as to reduce the amount of data that needs to be replicated between workers. Thus, the simulation manager may select spatial partition 102*j* (e.g., as opposed to another spatial partition on worker 103*a*) to transfer to worker 103*c*. Additionally, the simulation manager may select spatial partition 102*d* (e.g., as opposed to another spatial partition on worker 103*b*) to transfer to worker 103*c*. By moving spatial partitions 102*j* and 102*d* to worker 103*c*, the simulation manager may reduce the loads on workers 103*a* and 103*b*, respectively, and also reduce the amount of data that is transferred between workers 103*a* and 103*b*.

Figure 14:
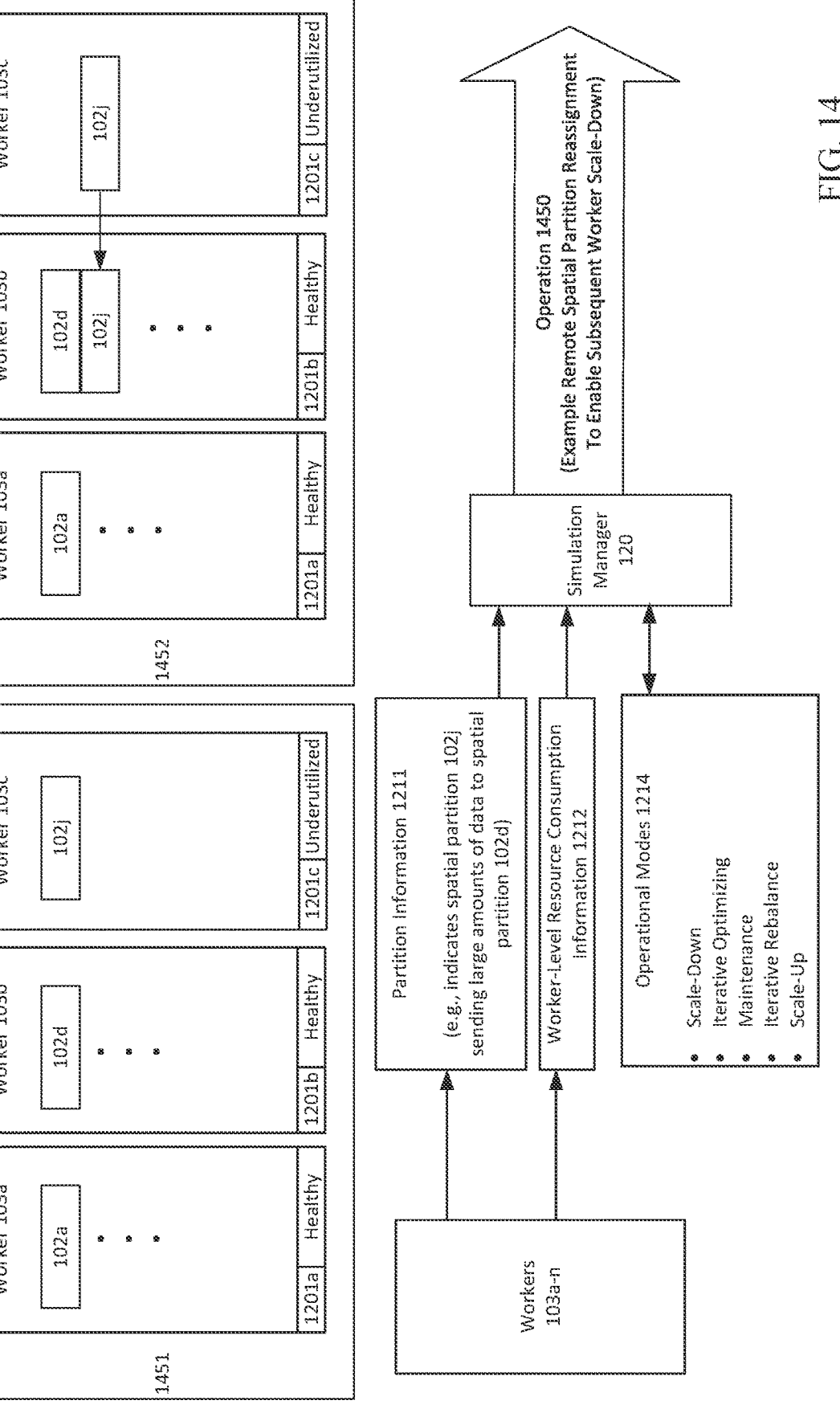
FIG. 14 is a diagram illustrating a third example remote spatial partition reassignment that enables a subsequent worker scale-down that may be used in accordance with the present description.

FIG. 14 shows an example in which operations 1450 is performed, which is an example remote spatial partition reassignment operation that enables a subsequent worker scale-down. Specifically, time 1451 represents a time prior to performance of operation 1450. As shown, at time 1451, worker 103*a* includes spatial partition 102*a* (as well as any number of other spatial partitions that are not shown in FIG. 14). Additionally, worker 103*b* includes spatial partition 102*d* (as well as any number of other spatial partitions that are not shown in FIG. 14). Furthermore, worker 103*c* includes spatial partition 102*j*. Statuses 1201*a-c* represent resource consumption statuses of workers 102*a-c*, respectively. Specifically, at time 1451, worker 103*a* has a status 1201*a* of healthy, worker 103*b* has a status 1201*b* of healthy, and worker 103*b* has a status 1201*b* of underutilized. Based on this information, simulation manager 120 may determine to empty-out worker 103*c* of its spatial partitions by moving spatial partition 102*j* away from worker 103*c*. This may allow worker 103*c* to be eventually removed from the spatial simulation, thereby reducing the resources used by the spatial simulation.

Time 1452 represents a time subsequent to performance of operation 1450. As shown, at time 1452, spatial partition 102*j* has been moved from worker 103*c* to worker 103*b*. This causes worker 103*c* to be empty (e.g., to have no assigned spatial partitions) and may allow worker 103*c* to be eventually removed from the spatial simulation. In this example, the partition information 1211 may indicate that spatial partition 102*j* is sending large amounts of data to spatial partition 102*d*. Based on this information, the simulation manager may determine that it would be advantageous to have spatial partitions 102*j* and 102*d* located together on the same worker, such as to reduce the amount of data that needs to be replicated between workers. Thus, because spatial partition 102*d* is assigned to worker 103*b*, the simulation manager may select worker 103*b* (e.g., as opposed to other workers) as the destination to which to transfer to spatial partition 102*j*.

In some examples, simulation manager 120 may determine a current operational mode for the spatial simulation, which reflects and a total amount of resource utilization across the spatial simulation as a whole (e.g., across all workers assigned to the spatial simulation). The current operational mode may be selected as one of a defined set of operational modes. In the examples of FIGS. 12-14, the current operational mode may be selected as one of operational modes 1214, which include worker scale-down, iterative optimizing, maintenance, iterative rebalance, and scale-up. In some examples, both remote spatial partition reassignment 111*e* and worker autoscaling 111*f* may be performed according to heuristics associated with each of the operational modes 1214.

In scale-down mode, the resource utilization is so low that it becomes advantageous to rearrange the spatial simulation to try to reset it to the starting set of placements. This may include moving previously reassigned spatial partitions back to the original workers to which they were originally assigned. The goals in scale-down mode may include both optimizing placements on a subset of available workers, and also emptying out some workers so they can eventually be removed. In scale-down mode, the simulation manager 120 may have a long-term plan and may orchestrate movement of spatial partitions in multiple phases, with the eventual goal of allowing spatial partitions to be re-merged. Additionally, in scale-down mode, the simulation manager 120 may also prioritize packing a subset of workers, and unpacking others, so it can down-scale and remove underutilized workers. In some examples, the scale-down mode may be the only mode in which workers are down-scaled.

In iterative optimizing mode, utilization is low, but still high enough that large-scale changes (e.g., large-scale partition reassignment) would be deemed disruptive. The goal in iterative optimizing mode may be to optimize for merging partitions across available workers. In iterative optimizing mode, the simulation manager 120 may perform some limited amounts of spatial partition reassignments and make incremental changes to try to encourage re-merging partitions. In iterative optimizing mode, simulation manager 120 may attempt to re-merge partitions, but may not downscale instances.

In the maintenance mode, utilization is within a window corresponding to normal system utilization. In the maintenance mode, there may be no need to scale-up or scale-down. This maintenance mode may be the default system state.

In the iterative rebalance mode, utilization is high, but still low enough that there may be no need to scale-up and add new instances yet. The goal in the iterative rebalance mode may be to transfer low-utilization spatial partitions onto other instances, such as to achieve an approximately even distribution of resource utilization across workers.

In the scale-up mode, utilization is high and there may not be enough workers to maintain a designated buffer on all workers. The goal in scale-up mode is to scale-up workers, including finding workers whose resource utilization is spiking the most and offloading spatial partitions from these overloaded workers to the newly added workers.

FIG. 15 is a flowchart illustrating an example local spatial partition reassignment and application autoscaling process that may be used in accordance with the present description. In some examples, any, or all, of operations 1510-1516 of FIG. 15 may be executed by a worker, such as any of workers 103*a-n* of FIGS. 1-3. At operation 1510, application workload information is received relating to a workload status of each application in an executing application set allocated to a worker. The worker may execute in association with a simulated space that is divided into a plurality of spatial partitions, wherein each spatial partition of the plurality of spatial partitions is assigned to a corresponding application that performs acts related to state associated with the spatial partition, and wherein at least one spatial partition of the plurality of spatial partitions has a state dependency on at least one other spatial partition of the plurality of spatial partitions.

As described above, a worker may receive application workload information relating to a workload status of each application executing on the worker. In some examples, the application workload information may be provided by each application to the worker and updated repeatedly, for example at a set time interval. The application workload information may be used to determine whether a respective application is overloaded, healthy, or underutilized. In some examples, the application workload information may explicitly identify a respective application as being overloaded, healthy, or underutilized. Also, in some examples, the application workload information may include other data that may be used to determine whether the respective application is overloaded, healthy, or underutilized. For example, in some cases, the application workload information may include information about various metrics for a respective application (e.g., success/failure to meet deadlines, total counts of entities in partitions assigned to the application, etc.) that may be used to determine whether the respective application is overloaded, healthy, or underutilized. For example, in some cases, an application may be considered to be overloaded if the total quantity of entities in its assigned spatial partitions meets or exceeds an upper threshold. Also, an application may be considered to be underutilized if the total quantity of entities in its assigned spatial partitions is at or below a lower threshold. Also, an application may be considered to be healthy if the total quantity of entities in its assigned spatial partitions is between the upper and lower thresholds. In some examples, different customers of the simulation service 190 may be able to configure different customer-specific metrics that are to be analyzed, as well as different customer-specific characteristics of those metrics (e.g., upper thresholds, lower thresholds, etc.), that may be analyzed by a worker in order to determine the workload status of respective applications.

At operation 1512, a second application is added to the executing application set based at least in part on the application workload information. The second application may be added to the executing application set dynamically during execution of a spatial simulation. As described above, an application scaling determination may be performed relating to changing an application quantity of the executing application set allocated to the worker. The application scaling determination may be a decision to add the second application to the executing application set. The second application may be added to the executing application set based at least in part on determinations that at least one other application of the executing application set is overloaded and no other application of the executing application set is underutilized. It is noted that operation 1512 is shown in FIG. 15 with dashed outline to show that it may be performed in application scale-up scenarios but may not be performed in other scenarios (e.g., such as when no applications are overloaded and/or when one or more applications are underutilized). For example, in some cases, when a given application is overloaded and when no other applications on the same worker are underutilized, then a determination may be made to perform an application scale-up by adding an application to the worker. In the above-described example of FIG. 5, because application 121*c* is overloaded and no other existing applications on worker 103*a* are underutilized at time 551, a determination is made to scale-up and add an additional application to worker 103*a*. As shown, at time 552, application 121*d* has been added to worker 103*a*. In some examples, the second application may be added to the executing application set by launching the second application on the worker and/or sending instructions to launch the second application on the worker.

At operation 1514, a first spatial partition of the plurality of spatial partitions is reassigned, based at least in part on the application workload information, from a first application in the executing application set to a second application in the executing application set. The first spatial partition may be reassigned dynamically during execution of a spatial simulation. In some examples, the reassigning of the first spatial partition may be based at least in part on a determination that the first application is overloaded. Additionally, in some examples, the reassigning of the first spatial partition may be based at least in part on a determination that the second application is underutilized or healthy. Furthermore, in some examples, the reassigning of the first spatial partition may be based at least in part on an exceeding of a minimum wait time between partition reassignments.

The reassigning of the first spatial partition at operation 1514 may be performed in a variety of scenarios. For example, in some cases, the reassigning of the first spatial partition at operation 1514 may be performed in combination with an application scale-up operation, such as to add the second application to the executing application set (e.g., in combination with operation 1512). In the above-described example of FIG. 5, because application 121*c* is overloaded and no other existing applications on worker 103*a* are underutilized at time 551, a determination is made to scale-up and add an additional application to worker 103a. As shown, at time 552, application 121d has been added to worker 103a. Additionally, at time 552, in order to reduce the load on application 121c, spatial partition 102b has been reassigned from application 121c to application 121d.

The reassigning of the first spatial partition at operation 1514 may also be performed in order to enable a subsequent application scale-down (e.g., in combination with operation 1516). In some examples, a worker may attempt to stack spatial partitions onto some applications in order to cause other underutilized applications to have no remaining spatial partitions, thereby allowing those other underutilized applications to be removed from the worker. In the above-described example of FIG. 6, in order to empty application 121a and allow its eventual removal (see FIG. 7), the worker 103a performs operation 650 to reassign spatial partition 102a from application 121a to application 121d.

The reassigning of the first spatial partition at operation 1514 may be also performed in scenarios when no applications are being added or removed. In this these scenarios, a spatial partition may be reassigned from one existing application (e.g., an existing application that is overloaded) to another existing application (e.g., an existing application that is underutilized or healthy). In some examples, the worker may first attempt to reassign the spatial partition from an overloaded application to an underutilized application. Also, in some examples, if there are no underutilized applications on the worker, the worker may then attempt to reassign the spatial partition from an overloaded application to a healthy application. In the example of FIG. 4, in order to reduce the workload on application 121a (which is overloaded at time 451), the worker 103a performs operation 450 to reassign spatial partition 102b from application 121a to application 121c (which is underutilized at time 451). Time 452 represents a time after performance of operation 450. As shown, at time 452, spatial partition 102b has been reassigned (via operation 450) from application 121a to application 121c.

In some examples, the reassigning of the first spatial partition at operation 1514 may include sub-operations 1514a-b. Specifically, at sub-operation 1514a, a signal is sent, to the first application, indicating that the first application has lost ownership of the first spatial partition. For example, for operation 450 of FIG. 4, worker 103a may send a signal to application 121a to indicate that application 121a has lost ownership of spatial partition 102b. Additionally, at sub-operation 1514b, a signal is sent, to the second application, indicating that the second application has gained ownership of the first spatial partition. For example, for operation 450 of FIG. 4, worker 103a may send a signal to application 121c to indicate that application 121c has gained ownership of spatial partition 102b.

At operation 1516, the first application is removed from the executing application set based at least in part on the application workload information. The first application may be removed from the executing application set dynamically during execution of a spatial simulation. As described above, an application scaling determination may be performed relating to changing an application quantity of the executing application set allocated to the worker. The application scaling determination may be a decision to remove the first application from the executing application set. The first application may be removed from the executing application set based at least in part on determinations that no partitions are assigned to the first application and at least one other application of the executing application set is underutilized.

It is noted that operation 1516 is shown in FIG. 15 with dashed outline to show that it may be performed in application scale-down scenarios but may not be performed in other scenarios (e.g., such as when no applications are empty and/or underutilized). For example, in some cases, when a first application has no partitions and at least one other application of the executing application set is underutilized, then a determination may be made to perform an application scale-down removing the first application from the worker. In the above-described example of FIG. 7, at time 751, application 121a has no assigned partitions and application 121c is underutilized. Based on this, a determination is made to scale-down and remove application 121a from worker 103a. As shown, at time 552, application 121a has been removed from worker 103a. In some examples, the second application may be removed from the executing application set by ceasing to execute the second application on the worker and/or sending instructions to cease execution of the second application on the worker.

FIG. 16 is a flowchart illustrating an example spatial partition manipulation process that may be used in accordance with the present description. At operation 1610, a first worker of a plurality of workers receives spatial partition data saturation information relating to one or more spatial partitions assigned to one or more applications allocated to the first worker. The plurality of workers may execute in association with a simulated space that is divided into a plurality of spatial partitions, wherein each spatial partition of the plurality of spatial partitions is assigned to a corresponding application that performs acts related to state associated with the spatial partition, and wherein at least one spatial partition of the plurality of spatial partitions has a state dependency on at least one other spatial partition of the plurality of spatial partitions. In some examples, the spatial partition data saturation information may be provided by each application to the worker and updated repeatedly, for example at a set time interval. The spatial partition data saturation information may be used to determine whether at least one of the one or more spatial partitions requires splitting, has an acceptable amount of data saturation, or is available for merging. In some examples, the spatial partition data saturation information may be collected and provided by an application to which a given spatial partition is assigned.

In some examples, the spatial partition data saturation information may explicitly identify a respective spatial partition as requiring splitting, having an acceptable amount of data saturation, or being available for merging. Also, in some examples, the spatial partition data saturation information may include other data that may be used to determine whether the respective spatial partition requires splitting, has an acceptable amount of data saturation, or is available for merging. For example, in some cases, the spatial partition data saturation information may include information about various metrics for a respective spatial partition (e.g., total counts of entities in the spatial partition, counts of entities moving into and/or towards the spatial partition, counts of entities moving out of and/or away from the spatial partition, etc.) that may be used to determine whether the respective spatial partition requires splitting, has an acceptable amount of data saturation, or is available for merging. In one specific example, a spatial partition having at or above an upper threshold of entities may require splitting, a spatial partition having at or below a lower threshold of entities may be available for merging, and a spatial partition that is between the upper and lower thresholds of entities may have an acceptable amount of data saturation. In some examples, different customers of the simulation service 190 may be able to configure different customer-specific metrics that are to be analyzed, as well as different customer-specific characteristics of those metrics (e.g., upper thresholds, lower thresholds, etc.), that may be analyzed by a worker in order to determine whether a respective spatial partition requires splitting, has an acceptable amount of data saturation, or is available for merging.

At operation 1612, the first worker performs, based at least in part on the spatial partition data saturation information, a first partition manipulation, the first partition manipulation including splitting of a parent spatial partition of the one or more spatial partitions into child spatial partitions or merging the child spatial partitions into the parent spatial partition. The first partition manipulation may be performed dynamically during execution of a spatial simulation. For example, in some cases, a parent spatial partition may be split into a set of child spatial partitions that are each smaller than the parent spatial partition. Additionally, a set of child spatial partitions may be merged into a parent spatial partition that is larger than each of the child spatial partitions.

In some examples, a spatial partition may be split based at least in part on a determination that the spatial partition requires splitting. For example, a spatial partition may be split based at least in part on a determination that a spatial partition has at or above an upper threshold of entities. In one specific example, a spatial partition may become highly crowded, such as after a large quantity of entities have moved into the spatial partition. In this scenario, the highly crowded spatial partition may require splitting. In the example of FIG. 8, because it is oversaturated at time 851, spatial partition 102*a* is split into four child partitions, which are spatial partitions 102*a*1-102*a*4. In some examples, if a given spatial partition is determined to require splitting, then a worker may attempt to split the spatial partition subject to certain rules. For example, these rules may include a maximum depth, which refers to a maximum quantity of ancestor partitions that are permitted to be split in order to create a child partition. The rules may also include a maximum quantity of partition slots, which refers to a maximum quantity of partitions that are permitted to be allocated to a given worker. Additionally, because splits and merges are potentially disruptive to the spatial simulation, a customer may request that a partition split or merge be delayed, such as until performance of a specified operation. The simulation service 190 may then instruct the worker to delay the split or merge based on the request. For example, a partition split may be delayed until performance of a subsequent partition merge operation.

In some examples, all child spatial partitions of a common parent may be merged based at least in part on a determination that all child spatial partitions of the common parent are assigned to a same application of the one or more applications. Also, all child spatial partitions of a common parent may be merged based at least in part on a determination that all child spatial partitions of the common parent are available for merging. In some cases, all child spatial partitions of a common parent may be merged based at least in part on determinations that all child spatial partitions of the common parent are assigned to a same application of the one or more applications and that all child spatial partitions of the common parent are available for merging. For example, in some cases, all child spatial partitions of a common parent may be merged only when all child spatial partitions of the common parent are assigned to a same application of the one or more applications and all child spatial partitions of the common parent are available for merging. In some examples, one or more child spatial partitions may be reassigned to be assigned to a same application as one or more other of the child spatial partitions of a common parent based on a determination that all the child spatial partitions of the common parent are available for merging.

In some examples, if all child partitions of the same former parent partition are determined to be available for merging and are assigned to the same application, then the worker may merge the child partitions back into the parent partition. By contrast, for scenarios in which all child partitions of the same former parent partition are determined to be available for merging but are not assigned to the same application, then the child partitions may not be merged until they are co-located together on the same application. For example, in some cases, the local spatial partition reassignment techniques described above may be employed in order to reassign one or more of the child spatial partitions to the same application as the other child spatial partitions and cause them to be co-located together on the same application. FIG. 9 shows an example in which a child partition is reassigned from one application to another in order to allow the child partition and its siblings to be merged back into a parent partition. In the example of FIG. 9, at time 951, spatial partitions 102*a*1-102*a*4, which are all of the siblings of a common parent spatial partition, all have statuses 802*a-d* of merge available. However, at time 951, although spatial partitions 102*a*1-102*a*4 are all available to be merged, the spatial partitions 102*a*1-102*a*4 cannot be immediately merged because they are not assigned to the same application. In the example of FIG. 9, spatial partition 102*a*4 is reassigned from application 121*a* to application 121*b*. After spatial partition 102*a*4 is reassigned from application 121*a* to application 121*b*, spatial partitions 102*a*1-102*a*4 may be merged back into spatial partition 102*a*. FIG. 10 shows an example in which spatial partitions 102*a*1-102*a*4 are merged back into spatial partition 102*a*.

At operation 1614, the first worker generates partition metadata associated with the first partition manipulation. The partition metadata may indicate at least one of an identifier of a highest-level ancestor partition, an identifier of the parent spatial partition, a partition depth, or a child spatial partition quantity. In some examples, in order to assist in performance of partition merging operations, a collection of partition metadata may be generated and associated with each child spatial partition. In the example of FIG. 8, partition metadata 820 may be generated and associated with spatial partitions 102*a*1-102*a*4, which are children of spatial partition 102*a*. In this example, partition metadata 820 includes an identifier of the oldest ancestor partition from which the spatial partitions 102*a*1-102*a*4 descend, which is spatial partition 102*a*. Partition metadata 820 also includes an indication of a depth (which refers to a quantity of ancestor partition(s) that were split in order to create the child partition). In this example, the depth is one because only one ancestor partition (spatial partition 102*a*) is split to create spatial partitions 102*a*1-102*a*4. Partition metadata 820 also includes an identifier of the parent partition from which the spatial partitions 102*a*1-102*a*4 directly descend, which is spatial partition 102*a*. Partition metadata 820 also includes an indication of a quantity of child partitions that directly descend from the parent partition, which is four.

At operation 1616, the first worker transmits, to a simulation manger, a request for acceptance of the first partition manipulation, wherein the simulation manager transmits indications of accepted partition manipulations to the plurality of workers. At operation 1618, the first worker receives, from the simulation manager, the indications of the accepted partition manipulations. As described above, during remote spatial partition manipulation reporting 111*d*, indications of local spatial partition manipulations (e.g., splits and merges) that are made on a given spatial partition may be reported, by the given partition, to a simulation manager. The simulation manager may then report the partition manipulations to each other worker associated with the simulated space. This reporting assists the other workers, such as by allowing the other workers to properly identify the manipulated spatial partitions and to properly communicate with those partitions (e.g., to send, and request, state data to, and from, those partitions). As described above with reference to FIG. 11, each worker 103*a-n* may individually submit, to the simulation manager 120, partition manipulation acceptance requests 1161 corresponding to each local spatial partition manipulation (e.g., splits and merges) that is performed on that worker 103*a-n*. In some examples, each of the partition manipulation acceptance requests 1161 may include an indication of the type of manipulation (e.g., split or merge) and indications of the parent and child partitions involved in the manipulation. The simulation manager 120 may then choose to accept or reject each of the partition manipulation acceptance requests 1161. In some cases, the simulation manager 120 may choose to reject a given one of the partition manipulation acceptance requests 1161 when there is state on other workers that indicates that the corresponding manipulation cannot be accepted. For example, this may occur when a partition split would cause the global quantity of spatial partitions throughout the simulated space 100 to exceed a customer-specified threshold. The simulation manager 120 may send partition manipulation acceptance results 1162 to workers 103*a-n*, such as via a broadcast to all of the workers 103*a-n*. In some examples, each of the partition manipulation acceptance results 1162 may include an indication of the type of manipulation (e.g., split or merge), indications of the parent and child partitions involved in the manipulation, and indications of whether the corresponding acceptance request for the manipulation is accepted or rejected. In some examples, the simulation manager 120 may periodically issue reports that are broadcast to each worker 103*a-n*. Each report may provide a group of partition manipulation acceptance results 1162 that have been issued subsequent to the previous report.

At operation 1620, the first worker may send and/or receive state data based on the indications of the accepted partition manipulations. For example, a first spatial partition on the first worker may have a subscription to receive state data from a second spatial partition on a second worker. However, if the second spatial partition is merged or split, then this may result in a change to the spatial partition to which the first spatial partition is subscribed. Similarly, in some examples, the second spatial partition on the second worker may have a subscription to receive state data from the first spatial partition on the first worker. However, if the first spatial partition is merged or split, then this may result in a change to the spatial partition to which the second spatial partition is subscribed. The subscription may therefore be adjusted based on the split or the merger, such as to subscribe to one or more child partitions (or portions thereof) after a split or to subscribe to a parent partition (or portions thereof) after a merger.

FIG. 17 is a flowchart illustrating an example remote spatial partition reassignment and worker autoscaling process that may be used in accordance with the present description. In some examples, any, or all, of operations

1710-1718 of FIG. 17 may be performed by simulation manager 120. At operation 1710, worker-level resource consumption information is received for each worker of a plurality of workers. The plurality of workers may execute in association with a simulated space that is divided into a plurality of spatial partitions, wherein each spatial partition of the plurality of spatial partitions is owned by a corresponding worker of the plurality of workers, and wherein at least one spatial partition of the plurality of spatial partitions has a state dependency on at least one other spatial partition of the plurality of spatial partitions. The plurality of workers may therefore be used to implement the spatial simulation. As described above with reference to FIG. 12, each of workers 103*a-n* may report, to the simulation manager 120, worker-level resource consumption information 1212. In some examples, the worker-level resource consumption information 1212 may be updated repeatedly, for example at a set time interval.

The worker-level resource consumption information 1212 may be used to determine whether a respective worker is overloaded, healthy, or underutilized. In some examples, the worker-level resource consumption information 1212 may explicitly identify a respective worker as being overloaded, healthy, or underutilized. Also, in some examples, the worker-level resource consumption information 1212 may include other data that may be used to determine whether the respective worker is overloaded, healthy, or underutilized. For example, each worker may have a selected number of application slots for applications and a selected number of partition slots for spatial partitions. The worker-level resource consumption information 1212 may comprise indications of how many of a respective worker's application slots are at least one of used or available. The worker-level resource consumption information 1212 may also comprise indications of how many of a respective worker's partition slots are at least one of used or available. For a given worker, the worker-level resource consumption information 1212 may include, for example, indications of how many of the worker's application slots are currently being used by executing applications, indications of how many of the worker's application slots are available for additional applications, indications of how many of the worker's partition slots are currently being used by local spatial partitions, indications of how many of the worker's partition slots are currently being used by remotely-owned replicated spatial partitions, indications of how many of the worker's partition slots are available for additional spatial partitions, breakdowns of data emissions from the worker to other workers (e.g., an egress map with a rolling average based on a selected prior time period), breakdowns of data ingress to the worker to other workers (e.g., an ingress map with a rolling average based on a selected prior time period), and other information. In some examples, a worker may be considered to be overloaded when the quantity of applications that it owns exceeds a configurable threshold and/or when the quantity of spatial partitions that it owns exceeds a configurable threshold. For example, this may occur when the worker has started to use its application buffer space and/or its spatial partition buffer space, such as to mitigate a utilization spike associated with the spatial simulation.

At operation 1712, partition information is received for each locally owned spatial partition of each worker of the plurality of workers. As described above with reference to FIG. 12, each of workers 103*a-n* may report, to the simulation manager 120, partition information 1211. In some examples, the partition information 1211 may be updated repeatedly, for example at a set time interval. For a given worker, the partition information 1211 may include information for each locally owned spatial partition, which is each spatial partition owned by the given worker. The partition information 1211 may comprise data saturation information for each locally owned spatial partition. For a given spatial partition, the partition information 1211 may include indications of data saturation amounts for the spatial partition. In some examples, the indications of data saturation amounts for the spatial partition may include a value from zero to N that describes how full the partition is. In one specific example, a value of zero may indicate that a partition is empty. Additionally, value of 1.0 may represent the most data one shard can have. Additionally, values greater than 1.0 may also be used to allow for a scenario in which a spatial partition has been split, but the split has not yet been indicated to the simulation manager 120. For example, the value 2.0 may represent the most data two shards can have.

The partition information 1211 may comprise partition relationship information (e.g., an ingress map) indicating one or more other spatial partitions on which each locally owned spatial partition has state dependencies. For example, the partition relationship information may indicate one or more other spatial partitions from which each locally owned spatial partition receives state data. The partition relationship information may also indicate one or more other spatial partitions to which each locally owned spatial partition sends state data. The partition relationship information may comprise weights indicating spatial proportions of the one or more other spatial partitions on which each locally owned spatial partition has state dependencies. For example, a small weight (e.g., a weight of zero) may indicate that a spatial partition has a state dependency on only a small portion of another spatial partition. By contrast, a large weight (e.g., a weight of 1.0) may indicate that a spatial partition has a state dependency on a large portion, or all, of another spatial partition. In some examples, it may be difficult to determine an exact amount of data that is being replicated from one spatial partition to another, and weighting of spatial proportions in this manner may provide an effective estimation of the amount of data that is being transmitted. Also, in some examples, a partition-to-partition dependency graph may be generated based at least in part on the partition relationship information. The partition-to-partition dependency graph may indicate which spatial partitions have a state dependency on which other spatial partitions, as well as estimations of the amount of data being transmitted and received between spatial partitions.

At operation 1714, one or more worker scaling instructions related to adding an additional worker to the plurality of workers are issued based at least in part on the worker-level resource consumption information (e.g., for worker scale-up scenarios, such as shown in FIG. 13). The additional worker may be added dynamically during execution of the spatial simulation. As described above, in some examples, one or more worker scaling instructions related to changing a quantity of the plurality of workers may be issued based at least in part on the worker-level resource consumption information. Additionally, in some examples (e.g., for worker scale-up scenarios), the one or more worker scaling instructions may relate to adding the additional worker to the plurality of workers. It is noted that operation 1714 is shown in FIG. 17 with dashed outline to show that it may be performed in worker scale-up scenarios but may not be performed in other scenarios (e.g., such as when no workers are overloaded and/or when one or more workers are underutilized). Additional workers may be added in response to increased load. For example, in some cases, when one or more workers are overloaded and when no other workers have available capacity to receive additional spatial partitions (e.g., there are no underutilized workers), the simulation manager 120 may determine to add an additional worker to the spatial simulation. An example worker scale-up is described above with reference to FIG. 13. Specifically, at time 1351, worker 103a has a status 1201a of overloaded, and worker 103b has a status 1201b of overloaded. Additionally, at time 1351, worker-level resource consumption information 1212 may indicate that no other existing workers have available capacity to receive additional spatial partitions (e.g., there are no underutilized workers). Based on this information, simulation manager 120 may determine to perform a worker scale-up to add an additional worker (worker 103c) to the spatial simulation. As shown, at time 1352, worker 103c has been added to the spatial simulation.

At operation 1716, based at least in part on the worker-level resource consumption information and the partition information, one or more partition reassignment instructions are issued related to reassigning ownership of a first spatial partition of the plurality of spatial partitions from a first worker of the plurality of workers to an additional worker of the plurality of workers. As described above, the simulation manager 120 may use the worker-level resource consumption information 1212 and the partition information 1211 to determine, if, and when, to perform a remote spatial partition reassignment, and also determine the spatial partition to reassign and specific workers from which, and to which, to reassign the spatial partition.

In one specific example, the simulation manager 120 may create and complete a partition reassignment operation via two phases associated with a source worker (the worker from which the spatial partition is being reassigned) and a destination worker (the worker to which the spatial partition is being reassigned). In a first phase, an additional assignment mapping may be created that maps the spatial partition being reassigned to the destination worker. The additional assignment mapping may be configured with a destination flag and may be included in an update that is broadcast to all workers. The spatial partition may already be mapped to the source worker via an original assignment mapping that includes an owner flag. In a second phase, the destination flag in the additional assignment mapping may be replaced with an owner flag, and the owner flag in the original assignment mapping may be removed.

During the first phase, the source worker may receive the additional assignment mapping. In response to the additional assignment mapping, the source worker may replicate the state associated with the reassigned spatial partition to the destination worker. The destination worker may receive the state data and ensure that an application is available to process it (though no updates are made). During the second phase, the new destination worker may set its spatial partition as writable by the application. Additionally, the source worker may set its spatial partition as read-only and may remove ownership from its application. The source worker may then clean-up the partition.

The reassigning of ownership of the first spatial partition at operation 1716 may be performed in a variety of scenarios. For example, in some cases, the reassigning of ownership of the first spatial partition at operation 1716 may be performed in combination with a worker scale-up operation, such as to add the additional worker to the plurality of workers (e.g., in combination with operation 1714). In the above-described example of FIG. 13, because workers 103a and 103*b* are overloaded and no other existing workers have available capacity to receive additional spatial partitions (e.g., there are no underutilized workers) at time 1351, a determination is made to scale-up and add an additional worker. As shown, at time 1352, worker 103*c* has been added to the spatial simulation. Additionally, at time 1352, in order to reduce the load on worker 103*a*, spatial partition 102*j* has been reassigned from worker 103*a* to worker 103*c*. Furthermore, at time 1352, in order to reduce the load on worker 103*b*, spatial partition 102*d* has been reassigned from worker 103*b* to worker 103*c*.

The reassigning of ownership of the first spatial partition at operation 1716 may also be performed in order to enable a subsequent worker scale-down (e.g., in combination with operation 1718). In some examples, the simulation manager 120 may attempt to stack spatial partitions onto some workers in order to cause other underutilized workers to have no remaining spatial partitions, thereby allowing those other underutilized workers to be removed from the spatial simulation. In the above-described example of FIG. 14, in order to empty worker 103*c* and allow its eventual removal, the operation 1450 is performed to reassign spatial partition 102*j* from worker 103*c* to worker 103*a*.

The reassigning of ownership of the first spatial partition at operation 1716 may be also performed in scenarios when no workers are being added or removed. In this these scenarios, a spatial partition may be reassigned from one existing worker (e.g., an existing worker that is overloaded) to another existing worker (e.g., an existing worker that is underutilized or healthy). In some examples, the simulation manager 120 may use the partition information 1211 to select a particular spatial partition to reassign from the overloaded worker and to select another worker to which to reassign the spatial partition. As described above, FIG. 12 shows an example in which worker 103*a* is overloaded, and operation 1250 is performed to move spatial partition 102*j* from worker 103*a* to worker 103*b* in order to reduce the operational load on worker 103*a*.

In some examples, a resource impact associated with the reassigning of the ownership of the first spatial partition from the first worker to the additional worker may be determined, wherein the one or more partition reassignment instructions are issued based at least in part on the resource impact. For example, in some cases, the simulation manager 120 may use the partition information 1211 to determine a resource impact for reassigning each of the spatial partitions from an overloaded worker to another worker. For example, in some cases, it may be determined that a given spatial partition on an overloaded worker is sending large amounts of data to another spatial partition on another worker. In this scenario, there may be a large positive resource impact associated with transferring that spatial partition to the other worker, such as because the amount of data that is transferred between workers may be reduced. Thus, in this scenario, it may be advantageous to transfer that spatial partition to the other worker. In the example of FIG. 12, the partition information 1211 may indicate that spatial partition 102*j* is sending large amounts of data to spatial partition 102*d*. Based on this information, the simulation manager 120 may determine that it would be advantageous to have spatial partitions 102*j* and 102*d* located together on the same worker, such as to reduce the amount of data that needs to be replicated between workers. Thus, the simulation manager 120 may select spatial partition 102*j* (e.g., as opposed to another spatial partition on worker 103*a*) to transfer to worker 103*b*. By moving spatial partition 102*j* to worker 103*b*, the simulation manager may reduce the load on worker 103*a* and also reduce the amount of data that is transferred between workers 103*a* and 103*b*.

At operation 1718, one or more worker scaling instructions related to removing the first worker from the plurality of workers are issued based at least in part on the worker-level resource consumption information (e.g., for worker scale-down scenarios, such as shown in FIG. 14). The first worker may be removed dynamically during execution of the spatial simulation. As described above, in some examples, one or more worker scaling instructions related to changing a quantity of the plurality of workers may be issued based at least in part on the worker-level resource consumption information. Additionally, in some examples (e.g., for worker scale-down scenarios), the one or more worker scaling instructions may relate to removing the first worker from the plurality of workers. It is noted that operation 1718 is shown in FIG. 17 with dashed outline to show that it may be performed in worker scale-down scenarios but may not be performed in other scenarios (e.g., such as when no workers are empty and/or underutilized). Existing workers may be removed in response to decreased load. For example, in some cases, when no spatial partitions are assigned to a given worker, the simulation manager 120 may determine to remove the given worker from the spatial simulation. Additionally, in some examples, the simulation manager 120 may attempt to empty out underutilized workers in order to cause those workers to have no remaining spatial partitions, thereby allowing those workers to be removed from the spatial simulation. In the above-described example of FIG. 14, in order to empty worker 103*c* and allow its eventual removal, the operation 1450 is performed to reassign spatial partition 102*j* from worker 103*c* to worker 103*b*. As shown, at time 1452, spatial partition 102*j* has been moved from worker 103*c* to worker 103*b*. This causes worker 103*c* to be empty (e.g., to have no assigned spatial partitions) and may allow worker 103*c* to be eventually removed from the spatial simulation.

When reassigning spatial partitions to newly added workers, and when reassigning spatial partitions from underutilized workers to allow removal of those workers, the simulation manager 120 may also use the partition information 1211 to determine a resource impact for reassigning each of the spatial partitions between workers. For example, the simulation manager 120 may use the resource impact determinations to select a particular spatial partition to reassign from an overloaded worker to a new worker. Additionally, the simulation manager may use the resource impact determinations to select one or more other workers to which to reassign spatial partitions from an underutilized worker that is being emptied-out for removal.

In some examples, a current operational mode may be determined in which the simulated space is operating, wherein at least one of the one or more partition reassignment instructions or the one or more worker scaling instructions are issued based at least in part on the current operational mode. As described above, simulation manager 120 may determine a current operational mode for the spatial simulation, which reflects and a total amount of resource utilization across the spatial simulation as a whole (e.g., across all workers assigned to the spatial simulation). The current operational mode may be selected as one of a defined set of operational modes. In the examples of FIGS. 12-14, the current operational mode may be selected as one of operational modes 1214, which include worker scale-down, iterative optimizing, maintenance, iterative rebalance, and scale-up. In some examples, both remote spatial partition reassignment 111*e* and worker autoscaling 111*f* may be performed according to heuristics associated with each of the operational modes 1214. Some examples of these heuristics are described above and not repeated here.

Figure 18:
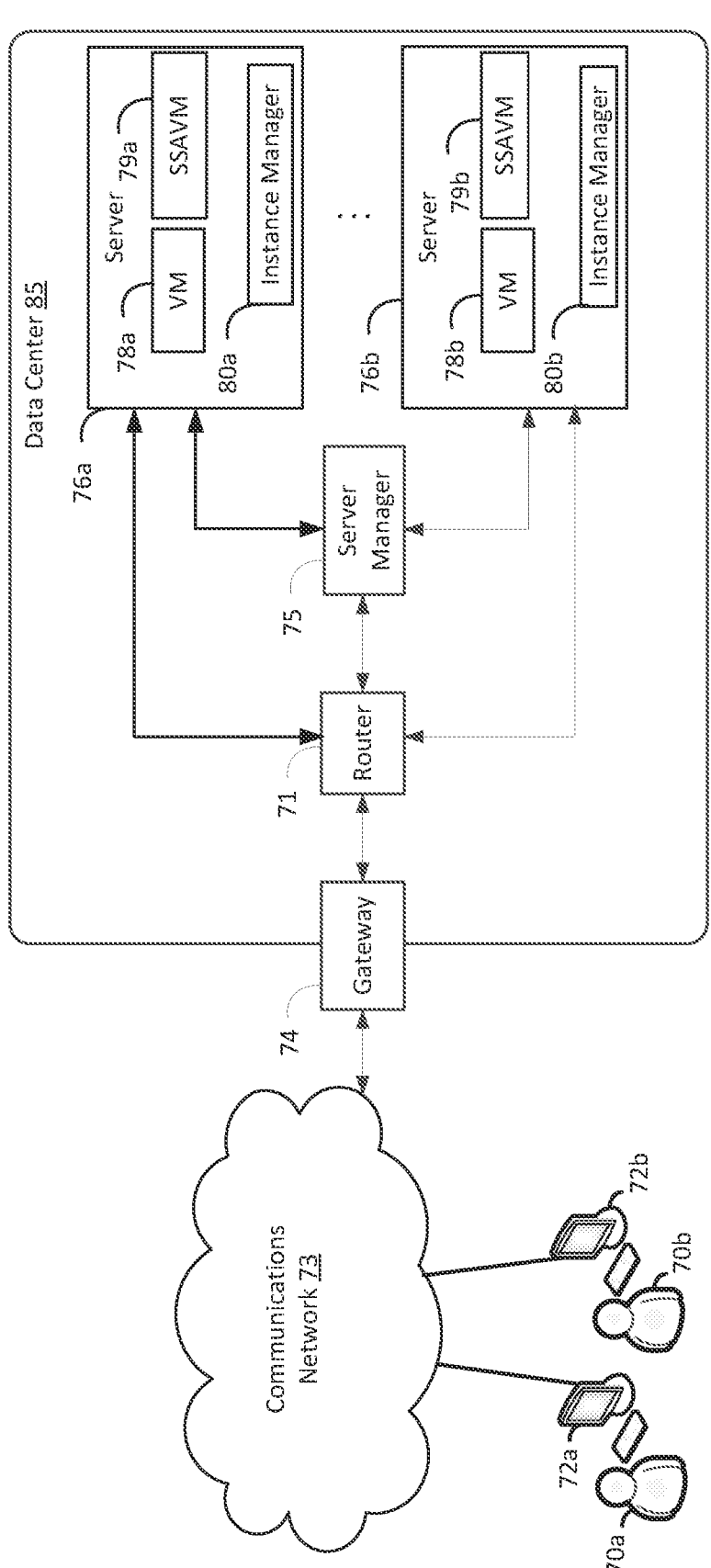
FIG. 18 is a diagram illustrating an example system for transmitting and providing data that may be used in accordance with the present description.

An example system for transmitting and providing data will now be described in detail. In particular, FIG. 18 illustrates an example computing environment in which the embodiments described herein may be implemented. FIG. 18 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include simulated space autoscaling (SSAVM's) 79*a-b*, which are virtual machines that are configured to execute any, or all, of the simulated space autoscaling techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 18, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 18 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 18, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 18, a server manager 75 is also employed to at least in part direct various communications to, from and/or between servers 76*a* and 76*b*. While FIG. 18 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 18 has been greatly simplified and that many more networks and networking devices may be utilized to interconnect the various computing systems disclosed herein. These network topologies and devices should be apparent to those skilled in the art.

It should also be appreciated that data center 85 described in FIG. 18 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 19:
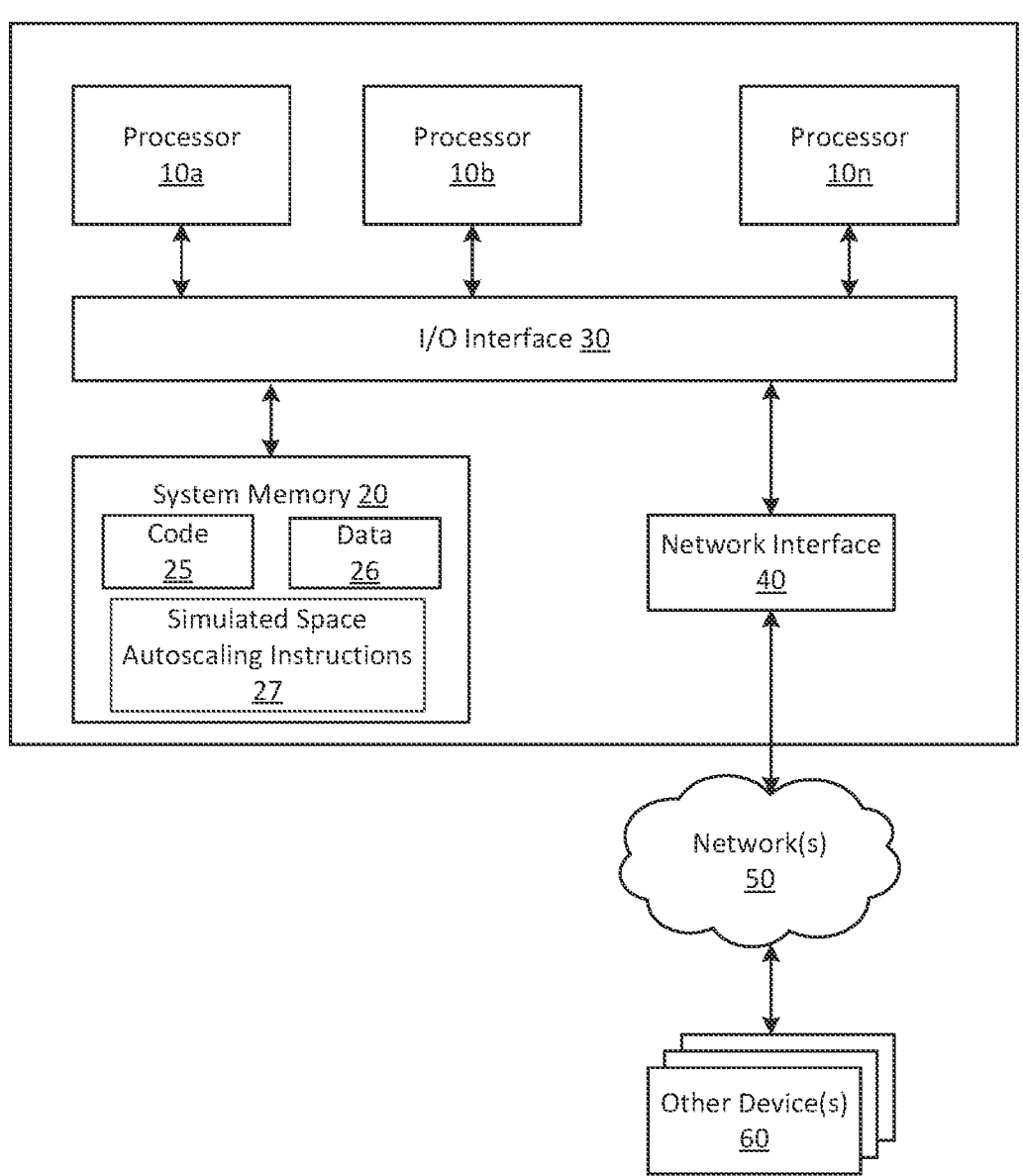
FIG. 19 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 19 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC. SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes simulated space autoscaling instructions 27, which are instructions for executing any, or all, of the simulated space autoscaling techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform operations comprising:

receiving application workload information relating to a workload status of each application in an executing application set allocated to a worker, wherein the worker executes in association with a simulated space that is divided into a plurality of spatial partitions, wherein each spatial partition of the plurality of spatial partitions is assigned to a corresponding application that performs acts related to state associated with the spatial partition, and wherein at least one spatial partition of the plurality of spatial partitions has a state dependency on at least one other spatial partition of the plurality of spatial partitions; and reassigning, based at least in part on the application workload information, a first spatial partition of the plurality of spatial partitions from a first application in the executing application set to a second application in the executing application set, wherein the reassigning of the first spatial partition comprises sending, to the first application, a first signal indicating that the first application has lost ownership of the first spatial partition and sending, to the second application, a second signal indicating that the second application has gained ownership of the first spatial partition.

2. The computing system of claim 1, wherein the reassigning of the first spatial partition is based at least in part on a determination that the first application is overloaded.

3. The computing system of claim 1, wherein the reassigning of the first spatial partition is based at least in part on a determination that the second application is underutilized or healthy.

4. The computing system of claim 1, wherein the operations further comprise:

adding, based at least in part on the application workload information, the second application to the executing application set.

5. The computing system of claim 1, wherein the operations further comprise:

removing, based at least in part on the application workload information, the first application from the executing application set.

6. A computer-implemented method comprising:

receiving application workload information relating to a workload status of each application in an executing application set allocated to a worker, wherein the worker executes in association with a simulated space that is divided into a plurality of spatial partitions, wherein each spatial partition of the plurality of spatial partitions is assigned to a corresponding application that performs acts related to state associated with the spatial partition, and wherein at least one spatial partition of the plurality of spatial partitions has a state dependency on at least one other spatial partition of the plurality of spatial partitions; and reassigning, based at least in part on the application workload information, a first spatial partition of the plurality of spatial partitions from a first application in the executing application set to a second application in the executing application set.

7. The computer-implemented method of claim 6, wherein the reassigning of the first spatial partition is based at least in part on a determination that the first application is overloaded.

8. The computer-implemented method of claim 6, wherein the reassigning of the first spatial partition is based at least in part on a determination that the second application is underutilized or healthy.

9. The computer-implemented method of claim 6, further comprising:

adding, based at least in part on the application workload information, the second application to the executing application set.

10. The computer-implemented method of claim 9, wherein the adding of the second application to the executing application set is based at least in part on determinations that at least one other application of the executing application set is overloaded and no other application of the executing application set is underutilized.

11. The computer-implemented method of claim 6, further comprising:

removing, based at least in part on the application workload information, the first application from the executing application set.

12. The computer-implemented method of claim 11, wherein the removing of the first application from the executing application set is based at least in part on determinations that no partitions are assigned to the first application and at least one other application of the executing application set is underutilized.

13. The computer-implemented method of claim 6, wherein the reassigning of the first spatial partition is based at least in part on an exceeding of a minimum wait time between partition reassignments.

14. The computer-implemented method of claim 6, wherein the reassigning of the first spatial partition comprises sending, to the first application, a signal indicating that the first application has lost ownership of the first spatial partition.

15. The computer-implemented method of claim 6, wherein the reassigning of the first spatial partition comprises sending, to the second application, a signal indicating that the second application has gained ownership of the first spatial partition.

16. One or more non-transitory computer-readable storage media having stored thereon computing instructions that, upon execution by one or more computing devices, cause the one or more computing devices to perform operations comprising:

receiving application workload information relating to a workload status of each application in an executing application set allocated to a worker, wherein the worker executes in association with a simulated space that is divided into a plurality of spatial partitions, wherein each spatial partition of the plurality of spatial partitions is assigned to a corresponding application that performs acts related to state associated with the spatial partition, and wherein at least one spatial partition of the plurality of spatial partitions has a state dependency on at least one other spatial partition of the plurality of spatial partitions; and reassigning, based at least in part on the application workload information, a first spatial partition of the plurality of spatial partitions from a first application in the executing application set to a second application in the executing application set.

17. The one or more non-transitory computer-readable storage media of claim 16, wherein the operations further comprise:

adding, based at least in part on the application workload information, the second application to the executing application set.

18. The one or more non-transitory computer-readable storage media of claim 17, wherein the adding of the second application to the executing application set is based at least in part on determinations that at least one other application of the executing application set is overloaded and no other application of the executing application set is underutilized.

19. The one or more non-transitory computer-readable storage media of claim 16, wherein the operations further comprise:

removing, based at least in part on the application workload information, the first application from the executing application set.

20. The one or more non-transitory computer-readable storage media of claim 19, wherein the removing of the first application from the executing application set is based at least in part on determinations that no partitions are assigned to the first application and at least one other application of the executing application set is underutilized.

* * * * *